United States Patent
Kuehne et al.

(10) Patent No.: US 12,466,048 B2
(45) Date of Patent: Nov. 11, 2025

(54) RECIPROCATING TOOL HAVING OFFSET SPUR GEAR AND COUNTERWEIGHTING ASSEMBLY

(71) Applicant: Black & Decker Inc., New Britain, CT (US)

(72) Inventors: Brent A Kuehne, Red Lion, PA (US); Zhicheng Qian, Suzhou (CN); Xin Bao, Suzhou (CN); Shihuai Wang, Suzhou (CN); Dongrong Qiu, Suzhou (CN); Jiachao Xu, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 6 days.

(21) Appl. No.: 18/396,926

(22) Filed: Dec. 27, 2023

(65) Prior Publication Data
US 2025/0214220 A1    Jul. 3, 2025

(51) Int. Cl.
*B25F 5/00*    (2006.01)
*B23D 51/16*   (2006.01)
*F16F 15/28*   (2006.01)

(52) U.S. Cl.
CPC .............. *B25F 5/006* (2013.01); *F16F 15/28* (2013.01); *B23D 51/16* (2013.01)

(58) Field of Classification Search
CPC ....... F16H 21/36; B23Q 5/027; B23D 49/162; B23D 51/16
See application file for complete search history.

(56) References Cited

U.S. PATENT DOCUMENTS

| | | |
|---|---|---|
| 635,227 A | 10/1899 | Bowden |
| 2,970,484 A | 2/1961 | Springer |
| 3,971,132 A | 7/1976 | Griffies et al. |

(Continued)

FOREIGN PATENT DOCUMENTS

| | | |
|---|---|---|
| CN | 114309799 A | 4/2022 |
| CN | 115889892 A | 4/2023 |

(Continued)

OTHER PUBLICATIONS

Extended European Search Report for European Patent Application No. 24220970.8, mailed on Jun. 17, 2025, 8 pages.

*Primary Examiner* — Daniel Jeremy Leeds
(74) *Attorney, Agent, or Firm* — Brake Hughes Bellermann LLP

(57) ABSTRACT

A reciprocating power tool includes a transmission that converts rotational force from a motor to linear forces output by a reciprocating device and a counterbalancing device. The transmission is a parallel axis transmission including a first gear portion and a second gear portion formed on a gear shaft, with the first gear portion and the second gear portion rotating together about a first rotational axis. The first gear portion rotates a first output gear and the second gear portion rotates a second output gear about a second rotational axis that is parallel to and offset from the first rotational axis. The first output gear drives the reciprocating device and the second output gear drives the counterbalancing device. The reciprocating device reciprocates linearly and the counterbalancing devices performs a linear reciprocating movement that is opposite that of the reciprocating device to counterbalance forces generated by operation of the reciprocating device.

26 Claims, 14 Drawing Sheets

(56) References Cited

U.S. PATENT DOCUMENTS

| | | |
|---|---|---|
| 5,212,887 A | 5/1993 | Farmerie |
| RE35,258 E | 6/1996 | Palm |
| 6,568,089 B1 | 5/2003 | Popik et al. |
| 6,810,589 B2 | 11/2004 | Lagaly et al. |
| 7,246,533 B2 | 7/2007 | Lagaly et al. |
| 7,363,713 B2 | 4/2008 | Kobayashi et al. |
| 7,996,996 B2 | 8/2011 | Hirabayashi |
| 8,141,444 B2 | 3/2012 | Lagaly et al. |
| 8,371,032 B2 | 2/2013 | Hirabayashi |
| 9,579,735 B2 | 2/2017 | Wattenbach et al. |
| 9,724,771 B2 | 8/2017 | Aoki et al. |
| 9,776,263 B2 | 10/2017 | Adams et al. |
| 10,300,541 B2 | 5/2019 | Adams et al. |
| 10,464,148 B2 | 11/2019 | Wattenbach et al. |
| 10,603,728 B2 | 3/2020 | Gall |
| 10,875,110 B2 | 12/2020 | Adams et al. |
| 10,960,475 B2 | 3/2021 | Gall |
| 11,311,952 B2 | 4/2022 | Wekwert et al. |
| 11,370,043 B2 | 6/2022 | Adams et al. |
| 11,453,093 B2 | 9/2022 | Baskar et al. |
| 11,607,738 B2 | 3/2023 | Adams et al. |
| 11,701,722 B2 | 7/2023 | Monzen et al. |
| 2007/0074408 A1 | 4/2007 | Zhang |
| 2012/0192440 A1 | 8/2012 | Jerabek et al. |
| 2013/0174428 A1 | 7/2013 | Naughton et al. |
| 2018/0193932 A1 | 7/2018 | Gall |
| 2020/0222996 A1 | 7/2020 | Cholst et al. |
| 2020/0398355 A1 | 12/2020 | Mougeotte et al. |
| 2025/0010388 A1* | 1/2025 | Jubeck ........... B23D 49/165 |

FOREIGN PATENT DOCUMENTS

| | | |
|---|---|---|
| DE | 10360929 A1 | 8/2004 |
| DE | 102007062869 A1 | 8/2008 |
| DE | 102007059897 A1 | 6/2009 |
| DE | 102014006530 B4 | 11/2015 |
| DE | 102020128432 A1 | 5/2021 |
| DE | 102008043375 B4 | 11/2021 |
| DE | 102022122174 A1 | 3/2023 |
| EP | 1407847 A2 | 4/2004 |
| EP | 1491277 B1 | 1/2006 |
| EP | 1502685 B1 | 3/2007 |
| EP | 1437200 B1 | 2/2011 |
| EP | 1582769 B1 | 10/2011 |
| EP | 1963053 B1 | 2/2012 |
| EP | 2480381 B1 | 5/2013 |
| EP | 2481508 B1 | 6/2016 |
| EP | 2379282 B1 | 9/2016 |
| EP | 3632603 A1 | 4/2020 |
| EP | 3756807 A1 | 12/2020 |
| EP | 3757427 A1 | 12/2020 |
| EP | 3911469 A1 | 11/2021 |
| GB | 635227 A | 4/1950 |
| WO | 2019152367 A1 | 8/2019 |
| WO | 2022075341 A1 | 4/2022 |

* cited by examiner

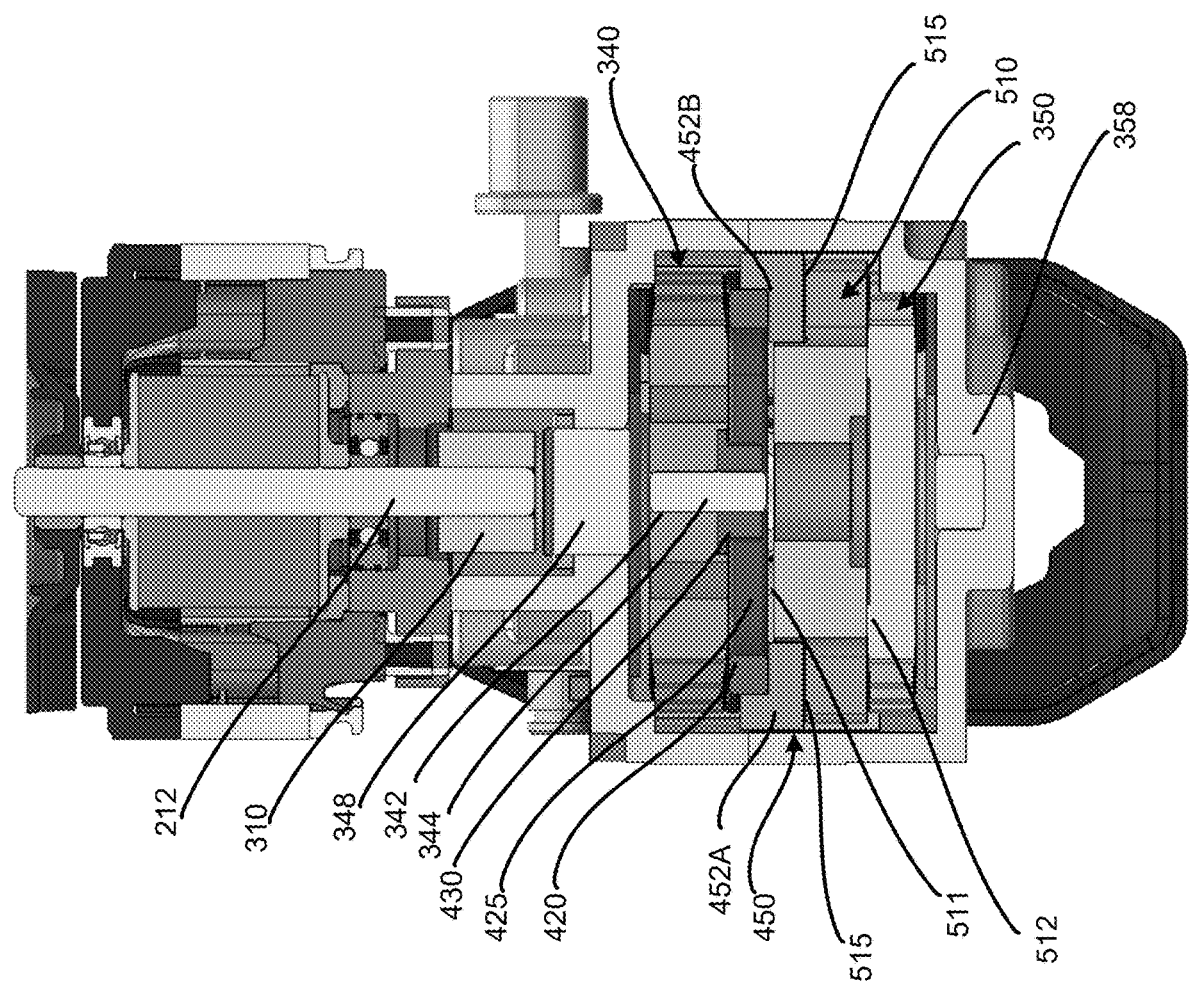

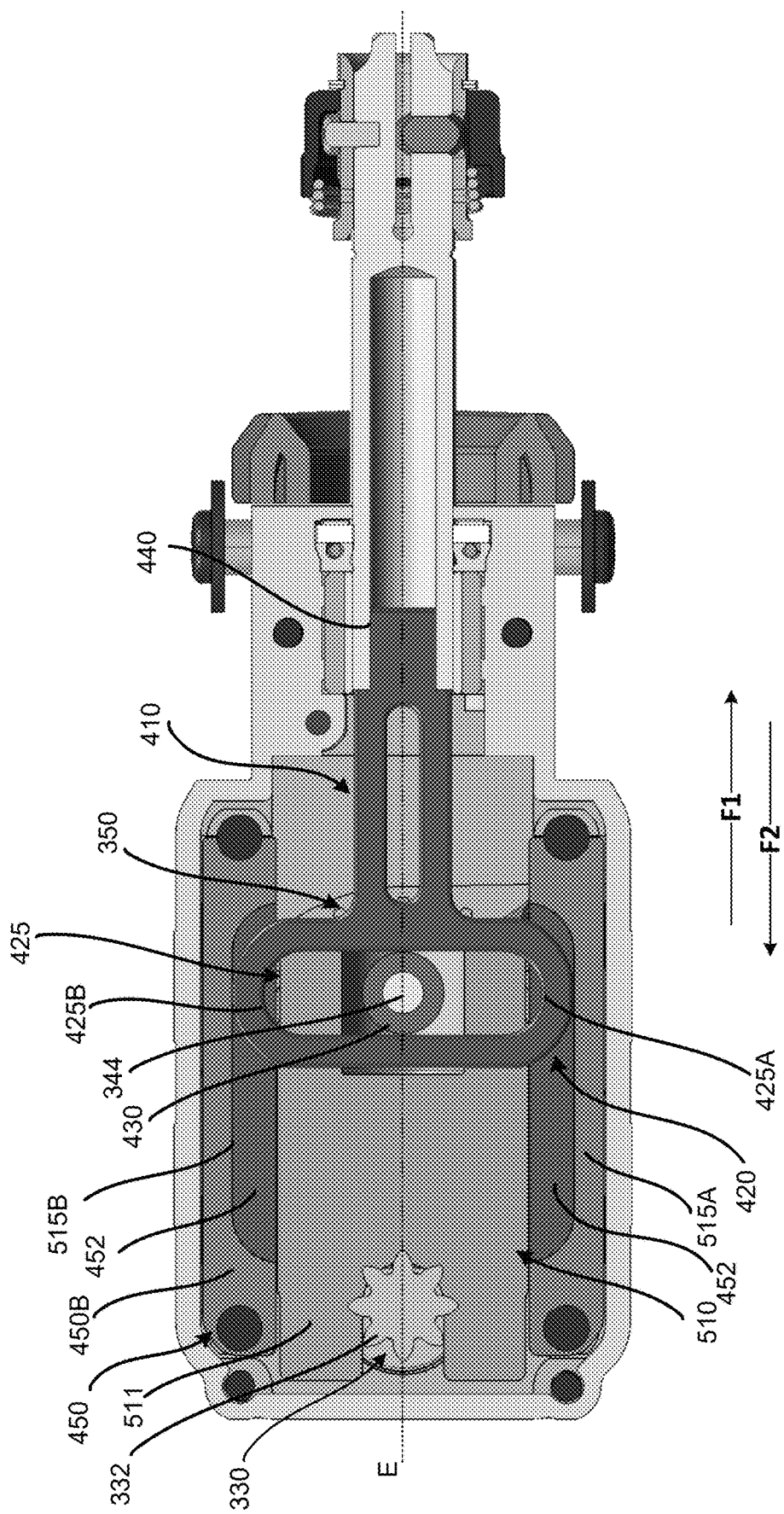

RECIPROCATING TOOL HAVING OFFSET SPUR GEAR AND COUNTERWEIGHTING ASSEMBLY

FIELD

This document relates, generally, to a reciprocating mechanism for a power tool, and in particular to a reciprocating device having an offset spur gear that drives a reciprocating device and a counterbalancing mechanism for a reciprocating power tool.

BACKGROUND

Reciprocating mechanisms are incorporated into various different types of tools, for example, reciprocating saws and jig saws, to convert rotational force, or motion, to linear force, or motion, for output by the tool. Operation of a motor of this type of tool generates a force, for example, a rotational force. Reciprocating mechanisms can convert the rotational force, or rotational motion, output by the motor to a linear force, or linear motion, to generate reciprocal motion of an output spindle of the tool. A transmission may provide for the transfer of force from the motor to the reciprocating mechanism. Vibration may be generated due to operation of the motor and the reciprocating mechanism, for example, as a result of acceleration/deceleration at extreme ends of travel of the reciprocating mechanism, particularly as operational speed and/or stroke length of the output spindle is increased. This vibration may adversely affect operation of the tool, and may produce user fatigue. Providing for balance in the reciprocating mechanism may improve user control of the tool, and may enhance utility and reliability of the tool, improving precision and allowing a user to operate the tool for longer periods of time. Further, a relatively compact tool profile may improve user control of the tool, and may allow the user to access smaller, tighter spaces using the tool.

SUMMARY

In some aspects, the techniques described herein relate to a reciprocating power tool, including: a motor; a reciprocating device; a counterbalancing device; and a transmission coupled between the motor and the reciprocating device, and between the motor and the counterbalancing device, wherein the transmission includes a gear shaft configured to rotate in response to a driving force from the motor, the gear shaft including: a first gear portion formed on a first portion of the gear shaft, the first gear portion driving a first output gear, the first output gear driving the reciprocating device; and a second gear portion formed on a second portion of the gear shaft, the second gear portion driving a second output gear, the second output gear driving the counterbalancing device.

In some aspects, the techniques described herein relate to a reciprocating power tool, wherein the gear shaft rotates about a first axis of rotation and the first output gear and the second output gear rotate about a second axis of rotation that is offset from and in parallel to the first axis of rotation.

In some aspects, the techniques described herein relate to a reciprocating power tool, wherein a linear reciprocating direction of the counterbalancing device is opposite a linear reciprocating direction of the reciprocating device so as to balance a linear reciprocating movement of the reciprocating device.

In some aspects, the techniques described herein relate to a reciprocating power tool, wherein a configuration of the first gear portion corresponds to a configuration of the second gear portion, and a configuration of the first output gear corresponds to a configuration of the second output gear, such that a rotational speed output by the first output gear corresponds to a rotational speed of the second output gear.

In some aspects, the techniques described herein relate to a reciprocating power tool, wherein a linear reciprocating direction of the reciprocating device and a linear reciprocating direction of the counterbalancing device is substantially orthogonal to a first axis of rotation of the gear shaft and a second axis of rotation of the first output gear and the second output gear.

In some aspects, the techniques described herein relate to a reciprocating power tool, wherein the reciprocating device includes: a reciprocating shaft positioned between the first output gear and the second output gear; a pin fixed to the first output gear and coupled in a slot formed in a yoke portion of the reciprocating shaft, wherein the pin is eccentrically positioned relative to the second axis of rotation.

In some aspects, the techniques described herein relate to a reciprocating power tool, wherein the pin is movably received in the slot formed in the yoke portion of the reciprocating shaft, such that the pin is configured to move in the slot formed in the yoke portion of the reciprocating shaft in response to rotation of the first output gear about the second axis of rotation, and the reciprocating shaft is configured to perform a linear reciprocating movement in response to movement of the pin in the slot formed in the yoke portion of the reciprocating shaft.

In some aspects, the techniques described herein relate to a reciprocating power tool, wherein the counterbalancing device includes: a counterweight member positioned between the second output gear and the reciprocating shaft, the counterweight member including a slot formed on a side portion of the counterweight member facing the second output gear; and a protrusion formed on the second output gear, eccentrically positioned with respect to the second axis of rotation, wherein the protrusion is movably received in the slot formed in the counterweight member.

In some aspects, the techniques described herein relate to a reciprocating power tool, wherein the protrusion is configured to move in the slot formed in the counterweight member in response to rotation of the second output gear about the second axis of rotation and the counterweight member is configured to perform a linear reciprocating movement in response to movement of the protrusion in the slot formed in the counterweight member.

In some aspects, the techniques described herein relate to a reciprocating power tool, wherein the protrusion is positioned approximately 180 degrees from the pin with respect to the second axis of rotation.

In some aspects, the techniques described herein relate to a reciprocating power tool, wherein the reciprocating shaft is configured to reciprocate linearly in response to rotation of the first output gear and movement of the pin in the slot formed in the yoke portion of the reciprocating shaft, and the counterweight member is configured to reciprocate linearly in response to rotation of the second output gear about the second axis of rotation movement of the protrusion in the slot formed in the counterweight member, the linear reciprocating direction of the counterweight member being opposite the linear reciprocating direction of the reciprocating shaft.

In some aspects, the techniques described herein relate to a reciprocating power tool, wherein the counterweight member also includes: a recess formed in a first end portion of the counterweight member and configured to receive a coupling portion of the reciprocating shaft; and an opening formed in a second end portion of the counterweight member and configured to selectively receive an intermediate portion of the gear shaft, between the first gear portion and the second gear portion, as the counterweight member reciprocates.

In some aspects, the techniques described herein relate to a reciprocating power tool, further including a rail guide positioned between the counterweight member and the reciprocating shaft, the rail guide including: a first rail seated on a first stepped portion at a first lateral side of the counterweight member; a first guide slot formed in the first rail; a second rail seated on a second stepped portion at a second lateral side of the counterweight member; and a second guide slot formed in the second rail, wherein the first guide slot and the second guide slot are positioned so as to guide reciprocating movement of the yoke portion of the reciprocating shaft and restrict rotation of the reciprocating shaft.

In some aspects, the techniques described herein relate to a reciprocating power tool, wherein the transmission also includes: a pinion gear coupled to an output shaft of the motor and configured to rotate in response to the driving force generated by the motor; a spur gear mounted on an end portion of the gear shaft and in meshed engagement with the pinion gear, wherein the spur gear and the gear shaft are configured to rotate in response to rotation of the pinion gear, the first output gear is configured to rotate in response to rotation of the gear shaft and first gear portion formed thereon to drive the reciprocating device, and the second output gear is configured to rotate in response to rotation of the gear shaft and second gear portion formed thereon to drive the counterbalancing device.

In some aspects, the techniques described herein relate to a reciprocating power tool, wherein: a position of the first output gear is set by a first alignment fixture that extends through an opening in a first portion of a housing of the power tool and into an opening formed in the first output gear, with key features formed on an external portion of the first alignment fixture corresponding to key features formed on an internal portion of the opening formed in the first output gear into which the first alignment fixture is inserted; and a position of the second output gear is set by a second alignment fixture that extends through a second opening in a second portion of the housing of the power tool and into an opening formed in the second output gear, with key features formed on an external portion of the second alignment fixture corresponding to key features formed on an internal portion of the opening formed in the second output gear into which the second alignment fixture is inserted.

In some aspects, the techniques described herein relate to a reciprocating power tool, wherein engagement of the key features formed on the external portion of the first alignment fixture with the key features formed on the internal portion of the opening in the first output gear, and engagement of the key features formed on the external portion of the second alignment fixture with the key features formed on the internal portion of the opening in the second output gear maintain a relative position of the first output gear and the second output gear, such that linear reciprocating movement of the reciprocating device is 180 degrees out of phase with linear reciprocating movement of the counterbalancing device.

In some aspects, the techniques described herein relate to a reciprocating power tool, including: a motor; a reciprocating device; a counterbalancing device; and a parallel axis transmission coupled between the motor and the reciprocating device, and between the motor and the counterbalancing device, to convert a rotational force output by the motor to a linear reciprocating movement of the reciprocating device, and to a linear reciprocating movement of the counterbalancing device that is opposite that of the reciprocating device so as to balance the linear reciprocating movement of the reciprocating device.

In some aspects, the techniques described herein relate to a reciprocating power tool, wherein the transmission includes: a gear shaft that rotates about a first axis of rotation in response to a rotational force transmitted from the motor, the gear shaft including: a first gear portion formed on a first portion of the gear shaft; a second gear portion formed on a second portion of the gear shaft; a first output gear in meshed engagement with the first gear portion and configured to rotate about a second axis of rotation in response to rotation of the gear shaft, wherein the first output gear drives the reciprocating device; and a second output gear in meshed engagement with the second gear portion and configured to rotate about the second axis of rotation in response to rotation of the gear shaft, wherein the second output gear drives the counterbalancing device, the second axis of rotation being offset from and parallel to the first axis of rotation.

In some aspects, the techniques described herein relate to a reciprocating power tool, wherein a configuration of the first gear portion corresponds to a configuration of the second gear portion, and a configuration of the first output gear corresponds to a configuration of the second output gear, such that a rotational speed output by the first output gear corresponds to a rotational speed of the second output gear In some aspects, the techniques described herein relate to a reciprocating power tool, wherein the reciprocating device includes: a reciprocating shaft positioned between the first output gear and the second output gear; and a pin fixed to the first output gear and coupled in a slot formed in a yoke portion of the reciprocating shaft, wherein the pin is eccentrically positioned relative to the second axis of rotation.

In some aspects, the techniques described herein relate to a reciprocating power tool, wherein the counterbalancing device includes: a counterweight member positioned between the second output gear and the reciprocating shaft, the counterweight member including a slot formed on a side portion of the counterweight member facing the second output gear; and a protrusion formed on the second output gear, eccentrically positioned with respect to the second axis of rotation, wherein the protrusion is movably received in the slot formed in the counterweight member.

In some aspects, the techniques described herein relate to a reciprocating power tool, wherein the protrusion is positioned approximately 180 degrees from the pin with respect to the second axis of rotation.

In some aspects, the techniques described herein relate to a reciprocating power tool, wherein the pin is movably received in the slot formed in the yoke portion of the reciprocating shaft, such that the pin is configured to move in the slot formed in the yoke portion in response to rotation of the first output gear about the second axis of rotation, and the reciprocating shaft is configured to perform a linear reciprocating movement in response to movement of the pin in the slot formed in the yoke portion of the reciprocating shaft; and wherein the protrusion is configured to move in the slot formed in the counterweight member in response to rotation of the second output gear about the second axis of rotation, and the counterweight member is configured to perform a linear reciprocating movement in response to movement of the protrusion in the slot formed in the counterweight member, the linear reciprocating movement of the counterweight member being opposite the linear reciprocating movement of the reciprocating shaft.

In some aspects, the techniques described herein relate to a reciprocating power tool, wherein the counterweight member also includes: a recess formed in a first end portion of the counterweight member and configured to receive a coupling portion of the reciprocating shaft; and an opening formed in a second end portion of the counterweight member and configured to selectively receive an intermediate portion of the gear shaft, between the first gear portion and the second gear portion, as the counterweight member reciprocates.

In some aspects, the techniques described herein relate to a reciprocating power tool, further including a rail guide positioned between the counterweight member and the reciprocating shaft, the rail guide including: a first rail seated on a first stepped portion at a first lateral side of the counterweight member; a first guide slot formed in the first rail; a second rail seated on a second stepped portion at a second lateral side of the counterweight member; and a second guide slot formed in the second rail, wherein the first guide slot and the second guide slot are positioned so as to guide reciprocating movement of the yoke portion of the reciprocating shaft and restrict rotation of the reciprocating shaft.

In some aspects, the techniques described herein relate to a reciprocating power tool, wherein the transmission also includes: a pinion gear coupled to an output shaft of the motor and configured to rotate in response to the rotational force generated by the motor; a spur gear mounted on an end portion of the gear shaft and in meshed engagement with the pinion gear, wherein the spur gear and the gear shaft are configured to rotate in response to rotation of the pinion gear, the first output gear is configured to rotate in response to rotation of the gear shaft and first gear portion formed thereon to drive the reciprocating device, and the second output gear is configured to rotate in response to rotation of the gear shaft and second gear portion formed thereon to drive the counterbalancing device.

The details of one or more implementations are set forth in the accompanying drawings and the description below. Other features will be apparent from the description and drawings, and from the claims.

BRIEF DESCRIPTION OF THE DRAWINGS

FIG. 3B is a cross-sectional view, taken along line B-B of FIG. 2B.

FIGS. 5A-5D illustrate phased operation of the example reciprocating device and the example counterbalancing device of the example power tool shown in FIGS. 2A-4.

DETAILED DESCRIPTION

Figure 1:
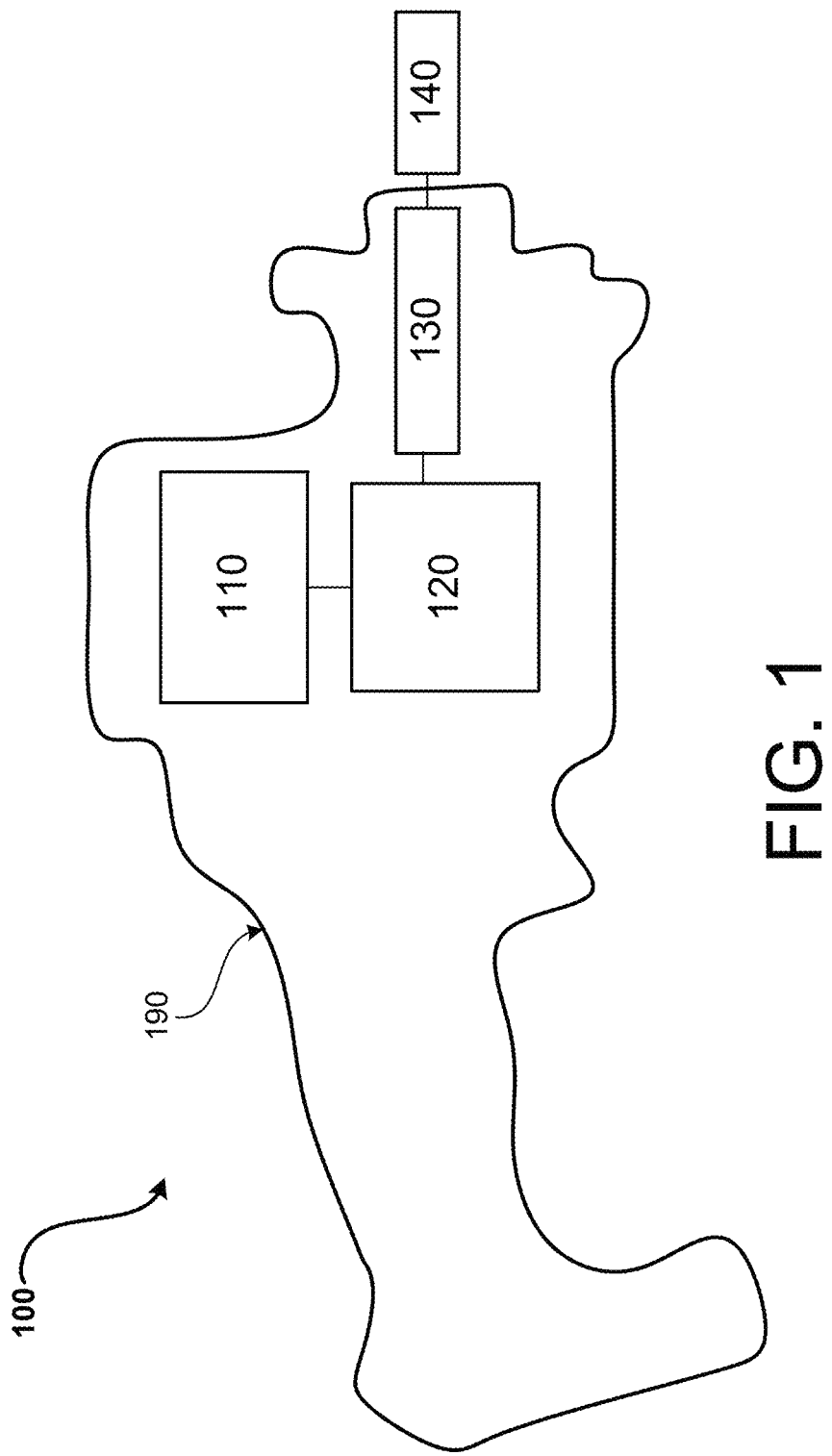
FIG. 1 is a schematic view of an example reciprocating power tool.

A schematic view of an example power tool 100 is shown in FIG. 1. The example power tool 100 includes a driving mechanism 110 generating a driving force, for example, a rotational driving force. A transmission 120 is coupled between the driving mechanism 110 and a reciprocating mechanism 130. The transmission 120 transfers the driving force generated by the driving mechanism 110 to the reciprocating mechanism 130. In an arrangement in which the driving force generated by the driving mechanism 110 is a rotational force, or a rotational motion, the transmission 120 may convert the rotational force, or rotational motion produced by the driving mechanism 110 into a linear force, or linear motion. The driving mechanism 110, the transmission 120, and the reciprocating mechanism 130 may be received in and/or coupled to a housing 190. In some examples, an output accessory 140 (such as, for example, a blade) is coupled to the reciprocating mechanism 130, and extends from the housing 190 to interact with a workpiece (not shown in FIG. 1). In some examples, the driving mechanism 110 is an electric motor that receives power from, for example, a power storage device (such as, for example, a battery), an external electrical power source, and the like. In some examples, the driving mechanism 110 is an air driven, or pneumatic motor, that is powered by compressed air introduced into the housing 190 from an external compressed air source. Other types of driving mechanisms, and other sources of power, may provide for power driven operation of the tool 100.

In a power tool that makes use of reciprocal motion, in accordance with implementations described herein, a relatively compact size, or profile, may enhance the ability to access relatively small, confined work areas with the tool, thus enhancing utility of the tool. In a powered tool that makes use of reciprocal motion, in accordance with implementations described herein, reduced vibration during operation may enhance precision, stability and utility of the tool, and may result in reduced operator fatigue during operation.

In a reciprocating power tool, vibration may be generated by multiple sources. In some examples, vibration is generated by interaction forces, or frictional forces, between an output accessory, such as a blade, and a work piece during operation. In some examples, inertial forces, due to relative movement of internal components of the tool, cause instability and/or vibration, whether or not the tool is engaged with a work piece. For example, as internal components of the various mechanisms of the reciprocating power tool move and change direction, reaction forces are generated to accelerate/decelerate the component(s). In a situation in which the power tool is not rigidly fixed to a mounting surface, but rather, held by an operator, the cyclic nature of this type of motion results in vibration experienced by the operator. This may, in turn, cause opposite, reciprocal motion to be felt, or experienced, by the operator as vibration. This vibration may adversely affect precision and utility of the tool and increase operator fatigue.

Figure 2A:
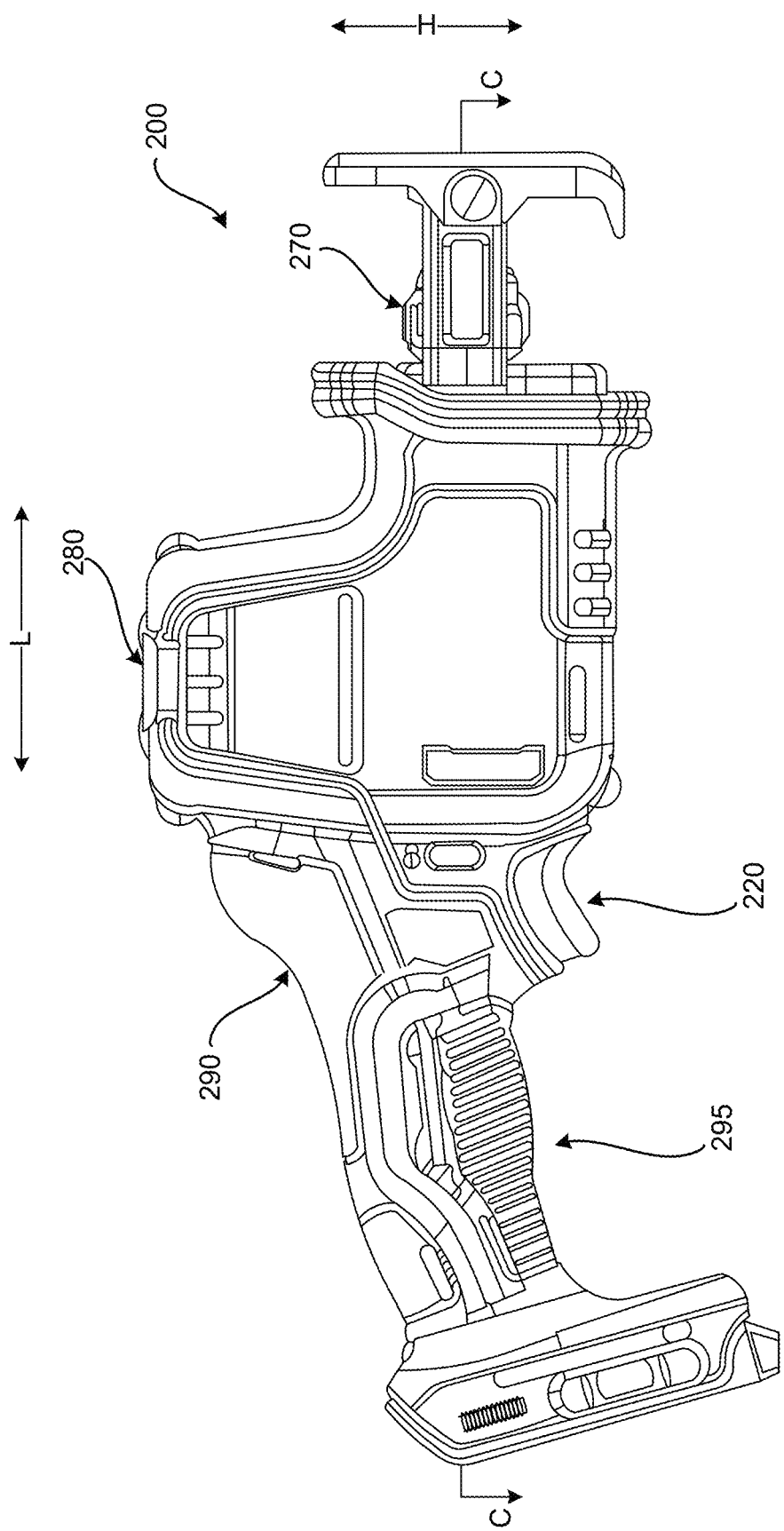
FIG. 2A is a side view.
Figure 2B:
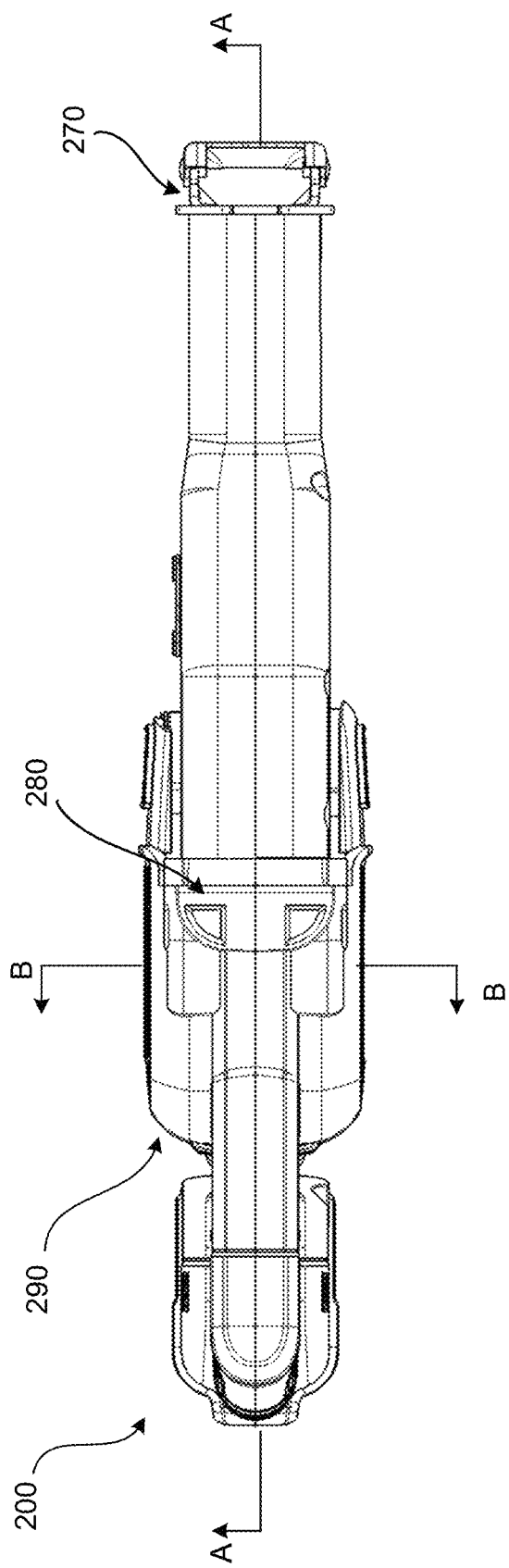
FIG. 2B is a top view, of an example reciprocating power tool.
Figure 2C:
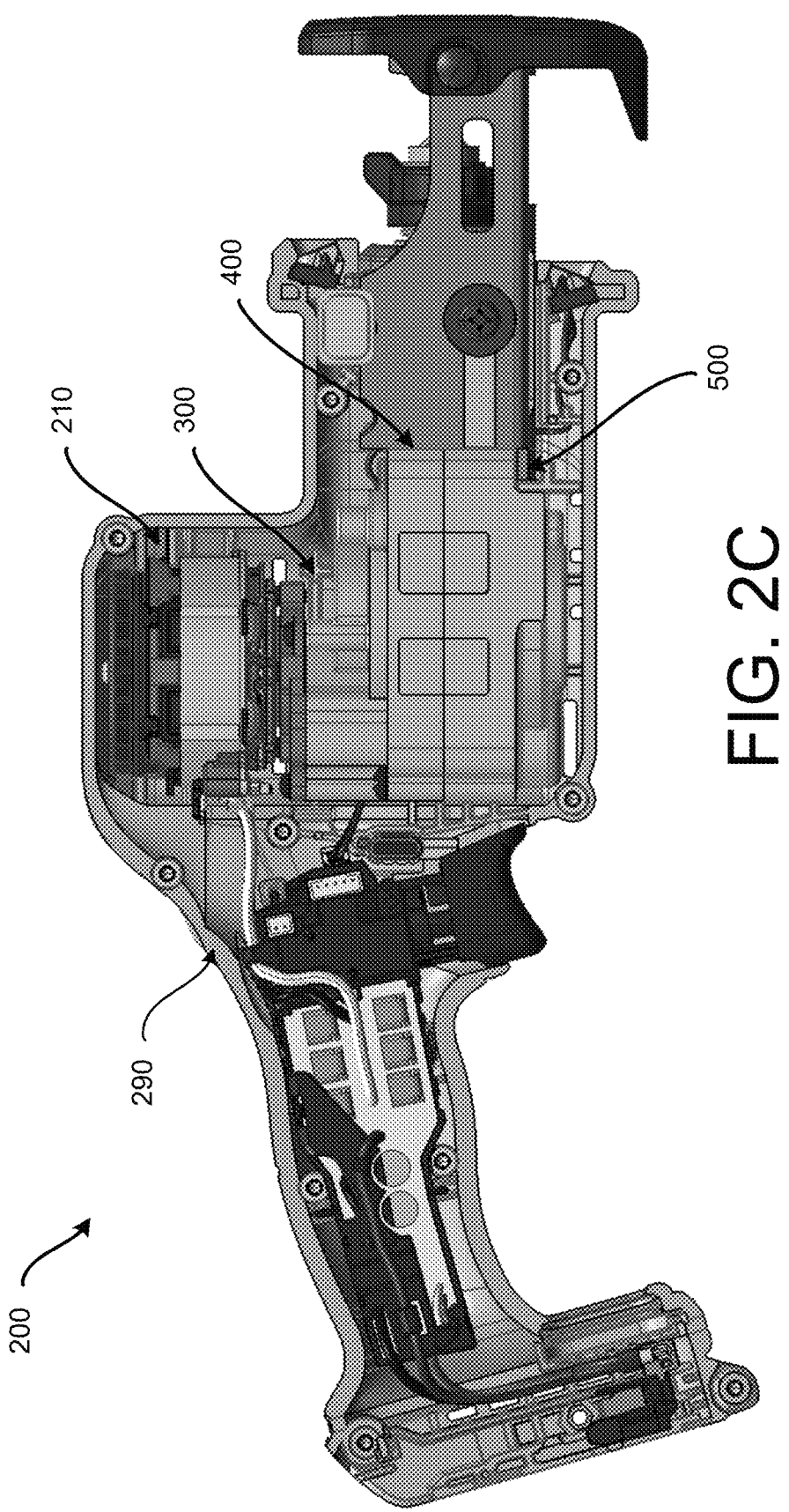
FIG. 2C is a side view of the example reciprocating power tool shown in FIGS. 2A and 2B, with a portion of a housing removed, so that internal components of the example reciprocating power tool are visible.

FIGS. 2A-2C illustrate an example reciprocating power tool 200, in accordance with implementations described herein. In particular, FIG. 2A is a side view, and FIG. 2B is a top view of the example power tool 200. FIG. 2C is a side view of the example reciprocating power tool 200 shown in FIGS. 2A and 2B, with a portion of a tool housing 290 of the example power tool 200 removed so that internal components of the example power tool 200 are visible.

Figure 3A:
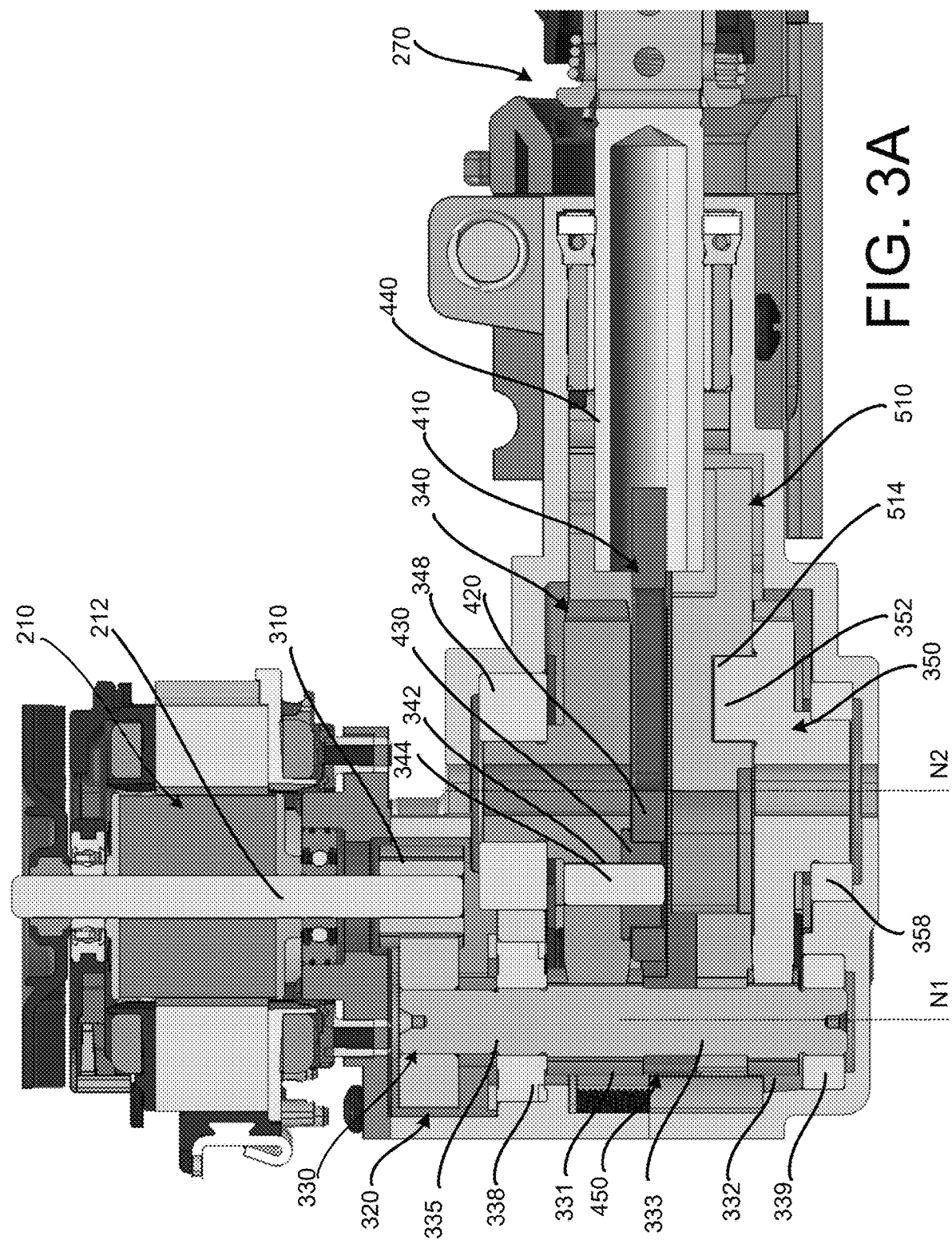
FIG. 3A is a cross-sectional view, taken along line A-A of FIG. 2B.
Figure 3C:
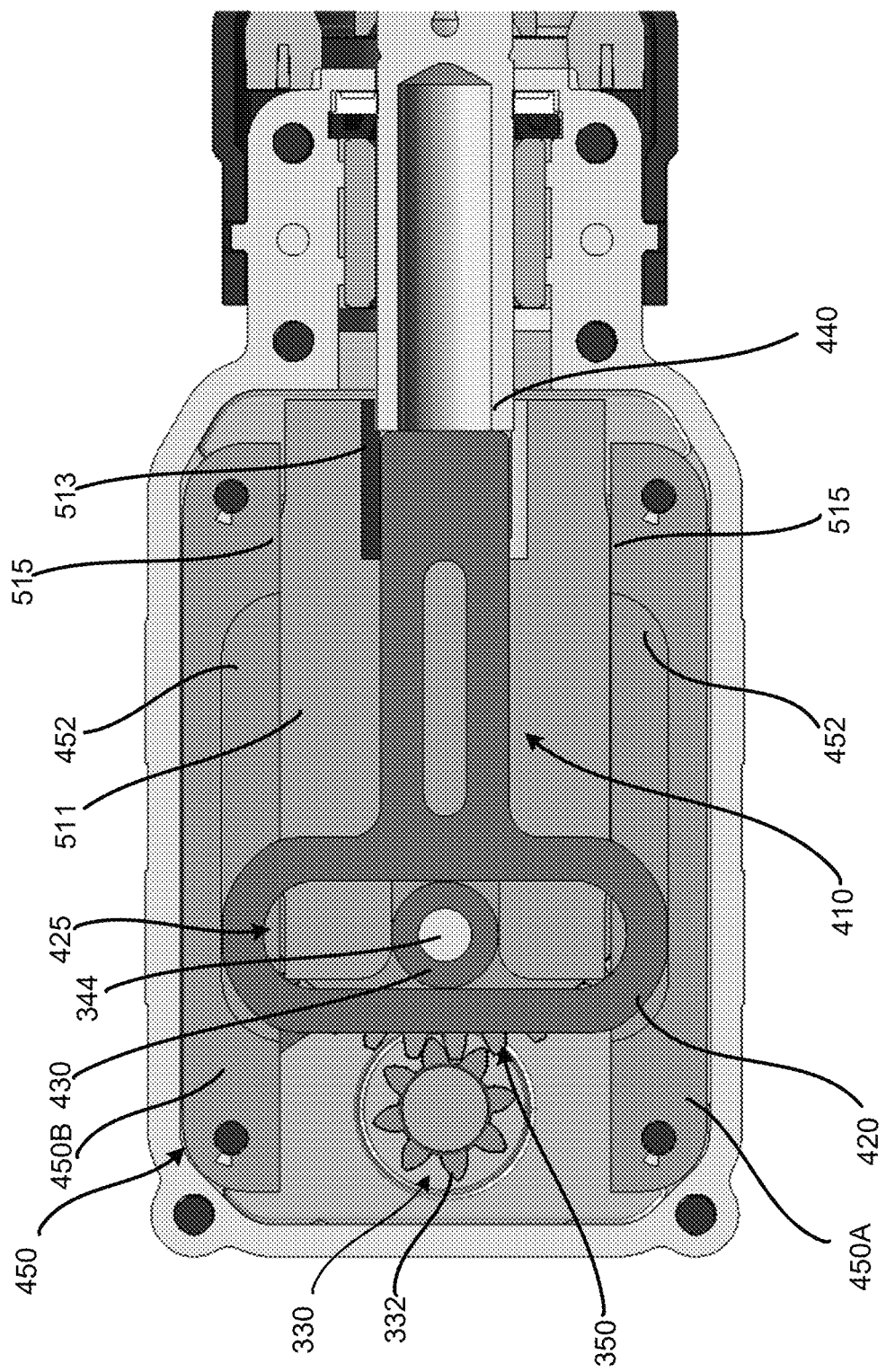
FIG. 3C is a cross-sectional view, taken along line C-C of FIG. 2A.
Figure 4A:
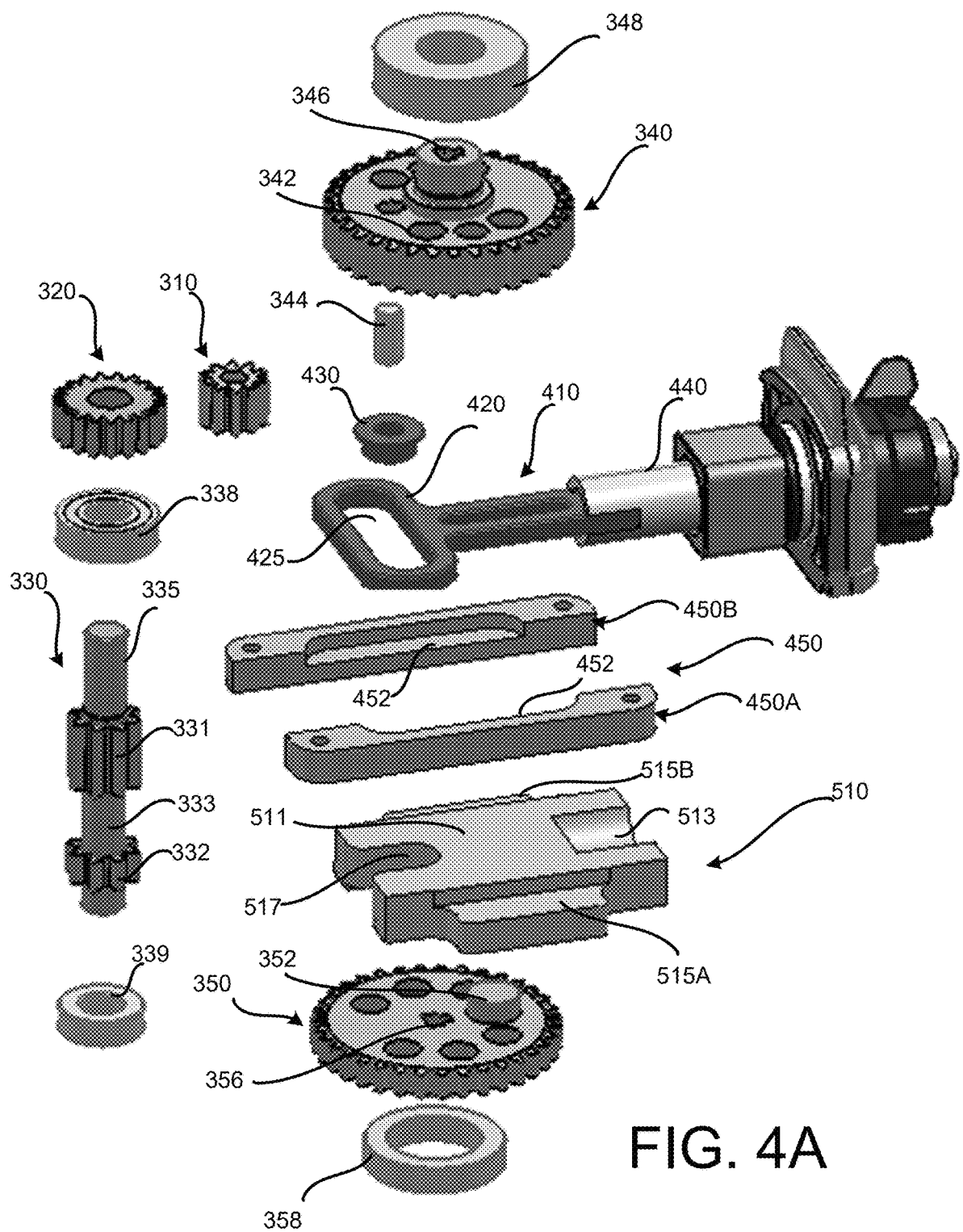
FIG. 4A is an exploded view of components of a transmission, a reciprocating device, and a counterbalancing device of the example reciprocating power tool shown in FIGS. 2A-3C.
Figure 4B:
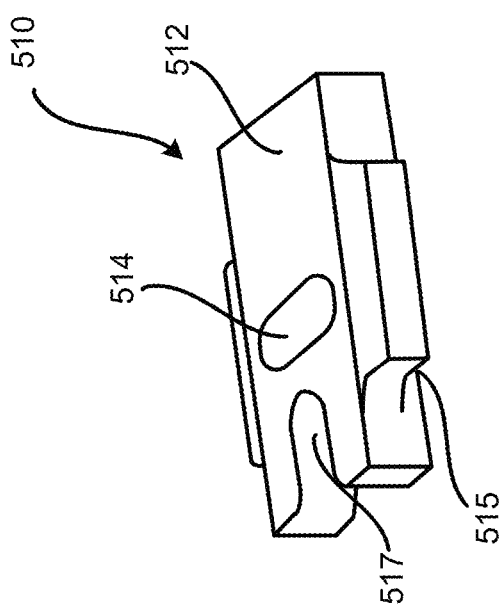
FIG. 4B is a perspective view illustrating a second side of an example counterweight member shown in FIG. 4A.

FIG. 3A is a partial cross-sectional view, taken along line A-A of FIG. 2B, illustrating components of an example motor 210, an example transmission 300, an example reciprocating device 400, and an example counterbalancing device 500 of the example power tool 200. FIG. 3B is a partial cross-sectional view, taken along line B-B of FIG. 2B, illustrating components of the example motor 210, the example transmission 300, the example reciprocating device 400, the example counterbalancing device 500 of the example power tool 200. FIG. 3C is a partial cross-sectional view, taken along line C-C of FIG. 2A, illustrating components of the example motor 210, the example transmission 300, the example reciprocating device 400, the example counterbalancing device 500 of the example power tool 200. The example power tool 200 shown in FIGS. 2A-3C is a power-driven reciprocating tool, and in particular, a power-driven reciprocating saw, simply for purposes of discussion and illustration. The principles to be described herein are applicable to other types of power-driven tools that implement reciprocating motion, and that may benefit from a relatively compact profile, or size, and a balanced reciprocating mechanism (such as, for example, jig saws, scroll saws, oscillating tools, air driven compressors, and the like). FIG. 4A is an exploded view of the components of the example transmission 300, the example reciprocating device 400, and the example counterbalancing device 500 of the example power tool 200. FIG. 4B is a perspective view illustrating a second side of an example counterweight member 510 of the example counterbalancing device 500.

As shown in FIGS. 2A-2B, the example power tool 200 includes a tool housing 290 in which internal components of the example power tool 200 are housed.

In the example arrangement shown in FIGS. 3A-3B, the motor 210 is received in the tool housing 290, defining a driving mechanism of the example power tool 200. The transmission 300, the reciprocating device 400, and the counterbalancing device 500 are also received in the tool housing 290. A tool holder 270 is provided at a working end portion of the tool housing 290, for coupling of output tools and/or devices and/or accessories to the reciprocating device 400 (for example, a blade in an example in which the example power tool 200 is a reciprocating saw). In the example arrangement shown in FIGS. 3A-4, the transmission 300 converts a driving force, for example, a rotational force, generated by the motor 210, to a linear force to be output by the reciprocating device 400 and an accessory tool coupled to the power tool 200 at the tool holder 270. In the example arrangement shown in FIGS. 3A-4, the counterbalancing device 500 is, for example, operably coupled to the reciprocating device 400 to counteract imbalances generated by the motor 210 and the reciprocating device 400 during operation. A trigger 220 for triggering operation of the example power tool 200 is provided at a handle portion 295 of the tool housing 290. One or more selection devices 280 are accessible to a user at the outside of the tool housing 290, to provide for user control of the example power tool 200. For example, the one or more selection devices 280 can be manipulated by the user to turn the example power tool 200 on and off, to set an operation mode of the example power tool 200, to set an operational speed of the example power tool 200, and the like.

In the example arrangement shown in FIGS. 3A-4, an output shaft 212 of the motor 210 extends into a pinion gear 310 received in the tool housing 290. The output shaft 212 of the motor 210 is fixed in the pinion gear 310, such that the pinion gear 310 transmits a rotary force, generated by the motor 210, to the transmission 300. A spur gear 320 is in meshed engagement with the pinion gear 310, such that the spur gear 320 rotates in response to rotation of the pinion gear 310. The spur gear 320 is mounted on a gear shaft 330. The spur gear 320 is fixed on the gear shaft 330, such that the spur gear 320 and the gear shaft 330 rotate together in response to rotation of the pinion gear 310.

The gear shaft 330 has an elongated body portion 335. A first gear portion 331 and a second gear portion 332 are formed on the body portion 335 of the gear shaft 330, with an intermediate portion 333 formed between the first gear portion 331 and the second gear portion 332. The gear shaft 330 is supported by a first bearing 338 and a second bearing 339. The first gear portion 331 of the gear shaft 330 is in meshed engagement with a first output gear 340 that drives the reciprocating device 400. The second gear portion 332 of the gear shaft 330 is in meshed engagement with a second output gear 350 that drives the counterbalancing device 500. The first output gear 340 is supported by a bearing 348. The second output gear 350 is supported by a bearing 358. In this example arrangement, rotation of the gear shaft 330, as described above, in turn drives rotation of the first output gear 340 (due to the meshed engagement of the first output gear 340 with the first gear portion 331 of the gear shaft 330) and drives rotation of second output gear 350 (due to the meshed engagement of the second output gear 350 with the second gear portion 332 of the gear shaft 330).

Thus, the rotational force of the motor 210, output via the output shaft 212, rotates the pinion gear 310, which in turn rotates the gear shaft 330, for example, about a first axis of rotation N1. Due to the meshed engagement of the first gear portion 331 with the first output gear 340, and the second gear portion 332 with the second output gear 350, the rotation of the gear shaft 330 causes the first output gear 340 and the second output gear 350 to rotate about a second axis of rotation N2. In the example arrangement shown in FIGS. 2A-4, the second axis of rotation N2 is substantially parallel to the first axis of rotation N1. An opening 342 is formed in a body portion of the first output gear 340. The opening 342 is eccentrically positioned relative to the second axis of rotation N2. A pin 344 is positioned in the opening 342, and extends out of the first output gear 340 to couple the first output gear 340 to the reciprocating device 400. In some examples, the pin 344 is fabricated separately from the first output gear 340 and is fixedly coupled in the opening 342 in the first output gear 340, such that the pin 344 moves together with the first output gear 340, about the second axis of rotation N2. In some examples, the pin 344 is integrally formed with the first output gear 340, such that the pin 344 moves together with the first output gear 340. Engagement of the pin 344 with the reciprocating device 400 drives reciprocating movement of a reciprocating shaft 410 of the reciprocating device 400, which in turn drives reciprocating movement of an output device, or output tool, or accessory, such as, for example, a blade, coupled to the reciprocating device 400.

In the example arrangement shown in FIGS. 3A-6, the reciprocating device 400 includes a reciprocating shaft 410. The reciprocating shaft includes a yoke portion 420 at a first end of the reciprocating shaft 410 and a coupling portion 440 at a second end of the reciprocating shaft 410. The coupling portion 440 may provide for the detachable coupling of an accessory such as, for example, a blade, to the reciprocating device 400. In the example arrangement shown in FIGS. 3A-6, a bushing 430 is received in a slot 425 formed in the yoke portion 420. The pin 344 is coupled in the bushing 430 (for example, fixedly coupled in the bushing 430), thereby coupling the transmission 300 to the reciprocating device 400.

The bushing 430 (and pin 344 received therein) is movable, for example, slidable, within the slot 425 in response to rotation of the first output gear 340. In the example arrangement shown in FIGS. 3A-6, a rail guide 450 is positioned at an outside of the yoke portion 420 of the reciprocating shaft 410. The rail guide 450 includes a first rail 450A and a second rail 450B. Each of the first rail 450A and the second rail 450B includes a guide slot 452 in which the yoke portion 420 of the reciprocating shaft 410 is received. The guide slot 452 guides reciprocating motion of the reciprocating shaft 410, i.e., the yoke portion 420 of the reciprocating shaft 410, and prevents rotation and/or translational movement of the reciprocating shaft 410.

In the example arrangement shown in FIGS. 3A-6, the counterbalancing device 500 includes a counterweight member 510, or a weight, positioned between the reciprocating shaft 410 and the second output gear 350. A first side portion 511 of the counterweight member 510 includes a recess 513 in which the coupling portion 440 of the reciprocating shaft 410 is received, and a pair of stepped portions 515 on which the rail guide 450 is seated. In particular, the first rail 450A is positioned on a first stepped portion 515A on a first lateral side of the counterweight member 510, and the second rail guide 450B is positioned on a second stepped portion 515B formed on a second lateral side of the counterweight member 510. An opening 517 is formed in an end portion of the counterweight member 510, opposite the recess 513. The intermediate portion 333 of the gear shaft 330 is fitted/received in the opening 517. A slot 514 is formed in a second side portion 512 of the counterweight member 510. A protrusion 352 formed on the second output gear 350 is received, for example, movably or slidably received, in the slot 514. In some examples, the protrusion 352 is integrally formed with the second output gear 350. In some examples, the protrusion 352 is separately fabricated and fixed to the second output gear 350. In the example arrangement shown in FIGS. 3A-6, the protrusion 352 is offset from, or eccentric to the axis of rotation N2 of the second output gear 350. Positioning of the protrusion 352 of the second output gear 350 in the slot 514 formed in the second side portion 512 of the counterweight member 510 couples the transmission 300 to the counterbalancing device 500.

The engagement of the pin 344, through the bushing 430 and into the slot 425 in the yoke portion 420 of the reciprocating shaft 410, may cause the pin 344/bushing 430 to move in the slot 425 in response to rotation of the first output gear 340, and may convert the rotational force (generated by the motor 210 and transmitted via the pinion gear 310, spur gear 320, the gear shaft 330, and the first output gear 340 to the reciprocating shaft 410) to a linear force output by the reciprocating device 400. Similarly, the engagement of the protrusion 352 of the second output gear 350 in the slot 514 formed in the second side portion 512 of the counterweight member 510 may cause the protrusion 352 to move in the slot 514 in response to rotation of the second output gear 350, and may convert the rotational force (generated by the motor 210 and transmitted via the pinion gear 310, spur gear 320, the gear shaft 330, and the second output gear 350 to the counterweight member 510) to a linear force output by the counterbalancing device 500. In the example arrangement shown in FIGS. 3A-6, the linear motion of the counterweight member 510 is opposite the linear motion of the reciprocating shaft 410, to balance the forces generated by the linear motion of the reciprocating device 400. The balancing of the forces generated due to the linear motion of the reciprocating device 400 in this manner may reduce or substantially eliminate vibration due to the reciprocating forces generated during operation of the example power tool 200. This will be described in more detail with respect to FIGS. 5A-5D.

FIGS. 5A-5D are top views of the reciprocating device 400 and the counterbalancing device 500 in phased operation. In particular, in the example arrangement shown in FIGS. 5A-5D, the components of the reciprocating device 400 and the counterbalancing device 500 are shown at 0 degrees—also 360 degrees (FIG. 5A), 90 degrees (FIG. 5B), 180 degrees (FIG. 5C), and 270 degrees (FIG. 5D) in response to the rotational output force from the motor 210, as described above.

Figure 5A:
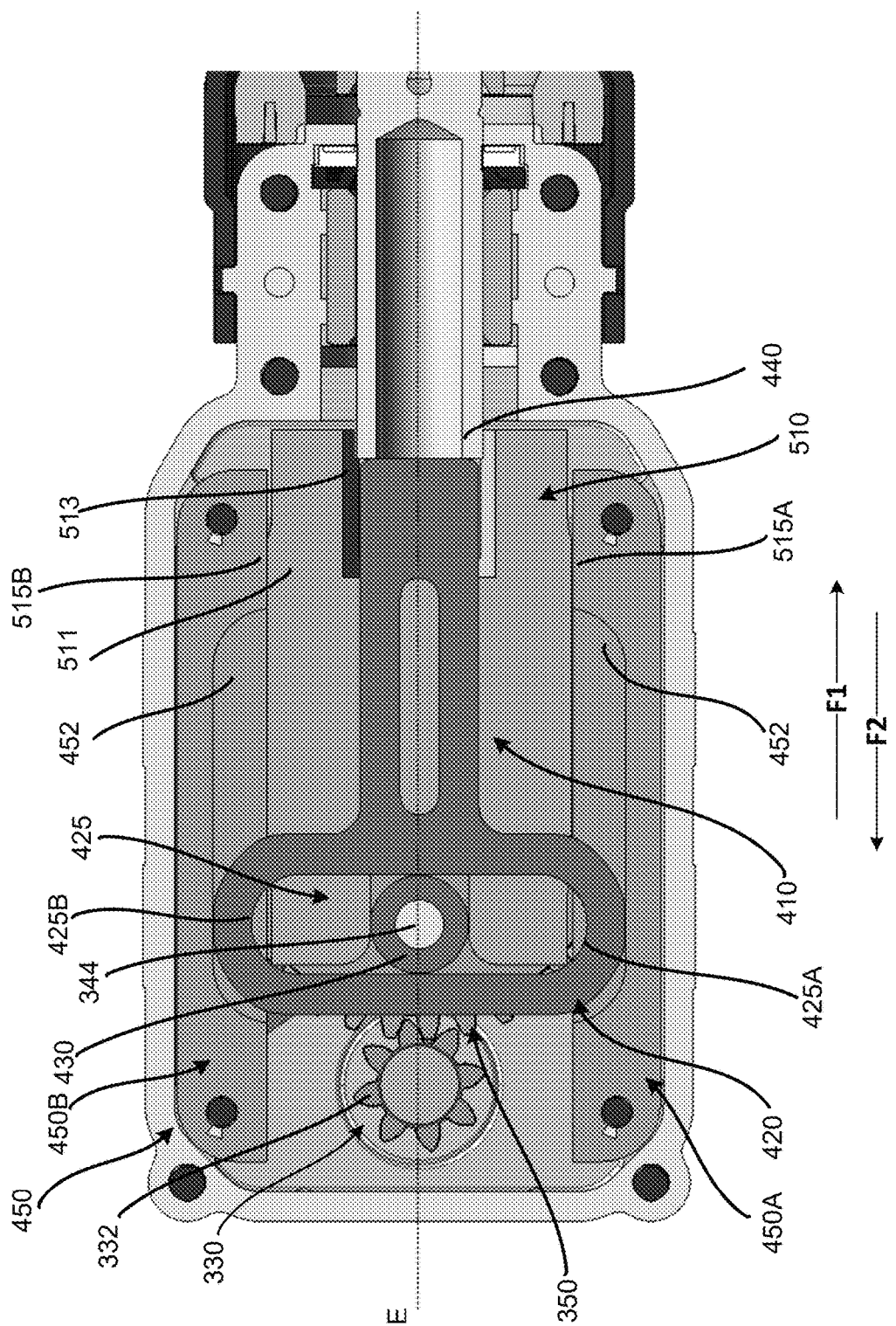

The example arrangement of components shown in FIG. 5A may correspond to a fully retracted state of the reciprocating device 400, at which rotational position of the first output gear 340 is at 0 degrees, prior to initiation of an outstroke of the reciprocating device 400. At 0 degrees, the pin 344 received in the bushing 430, is positioned at an intermediate position in the slot 425, between a first end portion 425A and a second end portion 425B of the slot 425. The 0 degree phase position shown in FIG. 5A corresponds to a first linear position of the reciprocating shaft 410 (for example, a first extreme of linear travel of the reciprocating shaft 410/yoke portion 420) along a linear reciprocating axis E. For example, in the arrangement and orientation illustrated in FIG. 5A, the reciprocating shaft 410 is in a far-left position along the linear reciprocating axis E, and the counterweight member 510 is in a far-right position along the linear reciprocating axis E. With the reciprocating shaft 410 in the first position, the counterweight member 510 is positioned to balance the movement of the reciprocating shaft 410.

Rotation of the output shaft 212 of the motor 210 causes rotation of the pinion gear 310, the spur gear 320, and the gear shaft 330, as described above. Rotation of the gear shaft 330 causes rotation of the first output gear 340 and the second output gear 350 engaged with the first gear portion 331 and the second gear portion 332. The pin 344 rotates together with the first output gear 340 and revolves around the axis of rotation N2. Similarly, the protrusion 352 rotates together with the second output gear 350 and revolves around the axis of rotation N2. This revolving movement of the pin 344 causes the pin 344 to move in the slot 425 formed in the yoke portion 420 of the reciprocating shaft 410, and a corresponding linear movement of the reciprocating shaft 410. Similarly, this revolving movement of the protrusion 352 causes the protrusion 352 to move in the slot 514 formed in the second side portion 512 of the counterweight member 510, and a corresponding linear movement of the counterweight member 510.

Figure 5B:
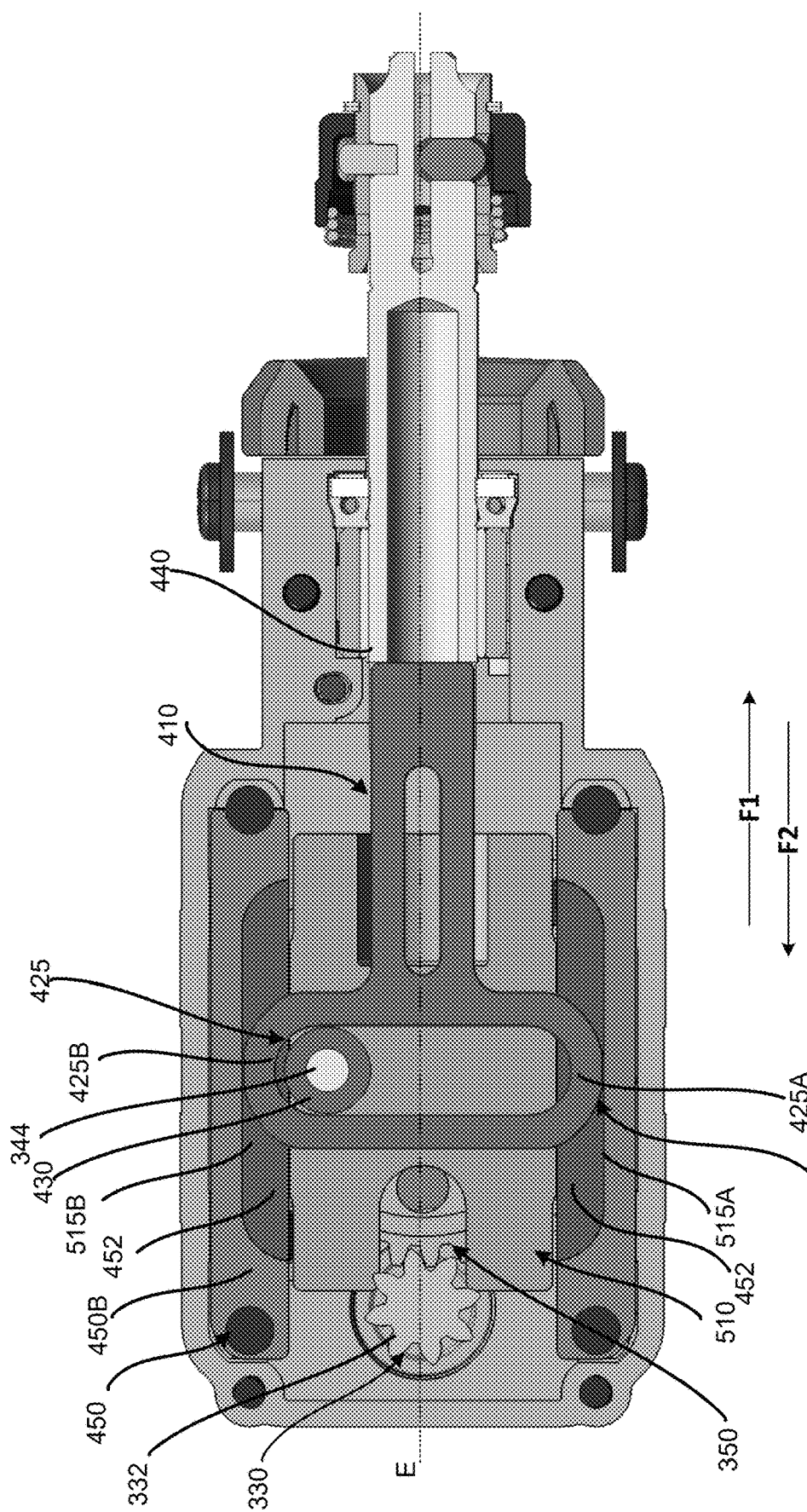

In particular, in moving from the 0 degree phase position shown in FIG. 5A to the 90 degree phase position shown in FIG. 5B, the first output gear 340 has rotated approximately 90 degrees about the axis of rotation N2, positioning the pin 344/bushing 430 at the second end portion 425B of the slot 425, and causing the reciprocating shaft 410 to move linearly, in the linear reciprocating direction F1. The 90 degree phase position shown in FIG. 5B may represent an intermediate linear position of the reciprocating shaft 410. Similarly, the movement of the protrusion 352 in the slot 514 formed in the counterweight member 510 causes the counterweight member 510 to move linearly, in the direction F2, opposite the linear movement of the reciprocating shaft 410, to an intermediate linear position, thus balancing the movement of the reciprocating device 400.

Continued rotation of the output shaft 212 of the motor 210 causes a corresponding movement of the first output gear 340, from the 90 degree phase position shown in FIG. 5B, to the 180 degree phase position shown in FIG. 5C. In the 180 degree phase position, the first output gear 340 has rotated an additional, approximately 90 degrees (from the 90 degree phase position shown in FIG. 5B) about the axis of rotation N2, positioning the pin 344/bushing 430 at the intermediate portion of the slot 425, and causing additional movement of the reciprocating shaft 410 in the direction F1 from the 90 degree phase position of FIG. 5B. Similarly, continued rotation of the output shaft 212 of the motor 210 causes corresponding movement of the second output gear 350, from the 90 degree phase position shown in FIG. 5B, to the 180 degree phase position shown in FIG. 5C. In the 180 degree phase position, the second output gear 350 has rotated an additional, approximately 90 degrees (from the 90 degree phase position shown in FIG. 5B) about the axis of rotation N2, with corresponding movement of the protrusion 352 of the second output gear 350 in the slot 514 of the counterweight member 510, and causing additional movement of the counterweight member 510 in the direction F2 from the 90 degree phase position shown in FIG. 5B, to counterbalance the movement of the reciprocating shaft 410. The 180 degree phase position shown in FIG. 5C may represent a second linear position (i.e., a second extreme of travel of the reciprocating shaft 410/yoke portion 420, opposite the first extreme of travel of the reciprocating shaft 410/yoke portion 420) of the reciprocating shaft 410 along the linear axis E. The second linear position may represent, for example, a fully extended position of the reciprocating device 400, for example, at a terminal end of an outstroke of the reciprocating shaft 410.

Figure 5D:
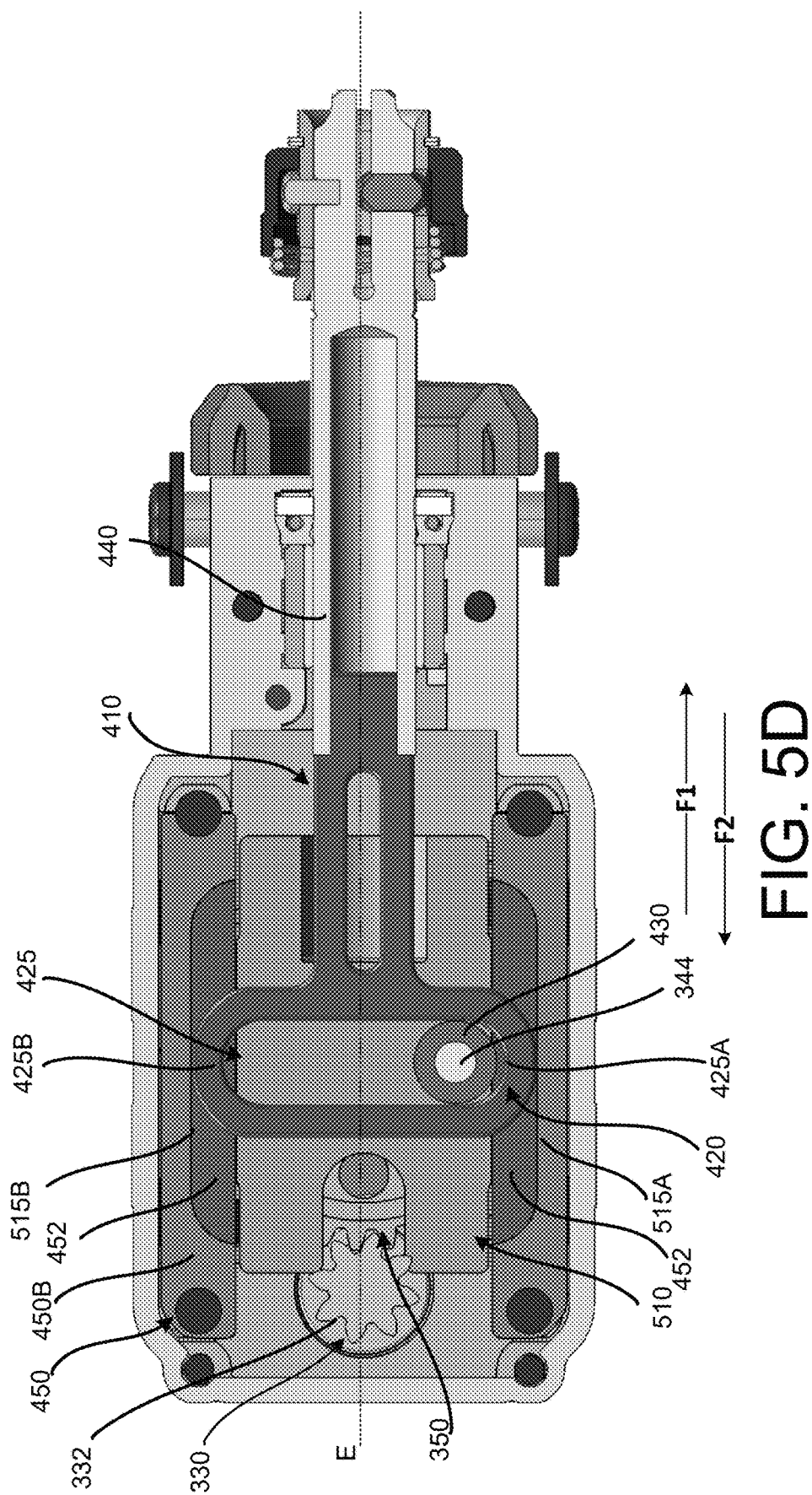

Continued rotation of the output shaft 212 of the motor 210 causes corresponding movement of the first output gear 340, from the 180 degree phase position shown in FIG. 5C, to the 270 degree phase position shown in FIG. 5D. In the 270 degree phase position, the first output gear 340 has rotated an additional, approximately 90 degrees (from the 180 degree phase position shown in FIG. 5C) about the axis of rotation N2, positioning the pin 344/bushing 430 at the first end portion 425A of the slot 425, and causing the reciprocating shaft 410 to have moved linearly, in the direction F2. The 270 degree phase position shown in FIG. 5D may represent an intermediate linear position of the reciprocating shaft 410, for example, in a return stroke of the reciprocating device 400. Similarly, continued rotation of the output shaft 212 of the motor 210 causes corresponding movement of the second output gear 350, from the 180 degree phase position shown in FIG. 5C, to the 270 degree phase position shown in FIG. 5D. In the 270 degree phase position, the second output gear 350 has rotated an additional approximately 90 degrees (from the 180 degree phase position shown in FIG. 5C) about the axis of rotation N2, with corresponding movement of the protrusion 352 of the second output gear 350 in the slot 514 of the counterweight member 510, and causing movement of the counterweight member 510 in the direction F1 from the 180 degree phase position shown in FIG. 5C, to counterbalance the movement of the reciprocating shaft 410.

Continued rotation of the output shaft 212 of the motor 210, the corresponding rotation of the first output gear 340 and the second output gear 350 and movement of the pin 344 and protrusion 352, as described above, returns the reciprocating device 400 to the first position/0 degree phase position shown in FIG. 5A. Thus, continued rotation of the output shaft 212 of the motor 210 produces continued reciprocating movement of the reciprocating device 400, and opposite reciprocating movement of the counterweight member 510 to balance the forces generated due to the linear reciprocating motion of the reciprocating device 400. The opposing reciprocating movement of the reciprocating device 400 and the counterbalancing device 500 along the linear axis E may be substantially orthogonal to the linear movement of the pin 344 within the slot 425 formed in the yoke portion 420 of the reciprocating shaft 410, and substantially orthogonal to the linear movement of the protrusion 352 in the slot 514 formed in the counterweight member 510.

Linear reciprocating motion of the counterbalancing device 500 that is opposite to the linear reciprocating motion of the reciprocating device 400, in the manner described above with respect to FIGS. 5A through 5D, may counterbalance the forces generated due to the conversion of the rotational force generated by the motor 210 to a linear force to be output by the example power tool 200, and the reciprocating motion of the reciprocating device 400. The counterbalancing of these forces reduces vibratory forces output by the example power tool 200. Reduced vibration allows for more precise operation and control of the tool, and reduces user fatigue, thus enhancing utility of a reciprocating power tool incorporating the example reciprocating device 400 and the counterbalancing device 500.

Effectiveness of the reduction/substantial elimination of vibration afforded by the operation of the counterbalancing device 500, as described above, relies on the reciprocating motion of the counterweight member 510 being 180 degrees out of phase with the reciprocating motion of the reciprocating shaft 410, as described above with respect to FIGS. 5A-5D. In order to maintain the reciprocating movement of the counterweight member 510 at 180 degrees out of phase with the reciprocating motion of the reciprocating shaft 410 to achieve the desired counterbalancing, a position of the pin 344 fixed to the first output gear 340 (and received in the slot 425 formed in the yoke portion 420 of the reciprocating shaft 410) is set and maintained at 180 degrees out of phase with a position of the protrusion 352 fixed to the second output gear 350 (and received in the slot 514 formed in the counterweight member 510). In order to maintain this 180 degrees out of phase arrangement, gear parameters, for example, sizing, number of teeth, and the like, of the first output gear 340 and the second output gear 350 may be matched. Similarly, gear parameters of the first gear portion 331 and the second gear portion 332 of the gear shaft 330 may be matched. This arrangement facilitates the maintaining of reciprocating motion of the counterbalancing device 500 at 180 degrees out of phase with the reciprocating motion of the reciprocating device 400. That is, the parallel axis configuration of the transmission 300 includes the single gear shaft 330 that rotates about the first axis of rotation N1, simultaneously driving both the first output gear 340 that drives the reciprocating device 400 (via the first gear portion 331 of the gear shaft 330) and the second output gear 350 that drives the counterbalancing device 500 (via the second gear portion 332 of the gear shaft 330). This, together with the positioning of the pin 344 and the protrusion 352 at 180 degree opposing positions with respect to the second axis of rotation N2, provides for 180 degree out of phase operation of the reciprocating device 400 and the counterbalancing device 500.

Thus, the parallel axis configuration of the transmission 300, and the configuration of the first gear portion 331/first output gear 340 and the second gear portion 332/second output gear 350 may maintain the reciprocating motion of the counterbalancing device 500 at 180 degrees out of phase with the reciprocating motion of the reciprocating device 400, to maintain the desired counterbalancing effects. In some examples, it may be difficult to provide for proper indexing of these components during assembly, to ensure that the pin 344 fixed to the first output gear 340 is positioned at 180 degrees from the protrusion 352 fixed to the second output gear 350 (relative to the axis of rotation N2) to provide for the desired 180 degree out of phase operation of the reciprocating device 400 and the counterbalancing device 500.

Figure 6:
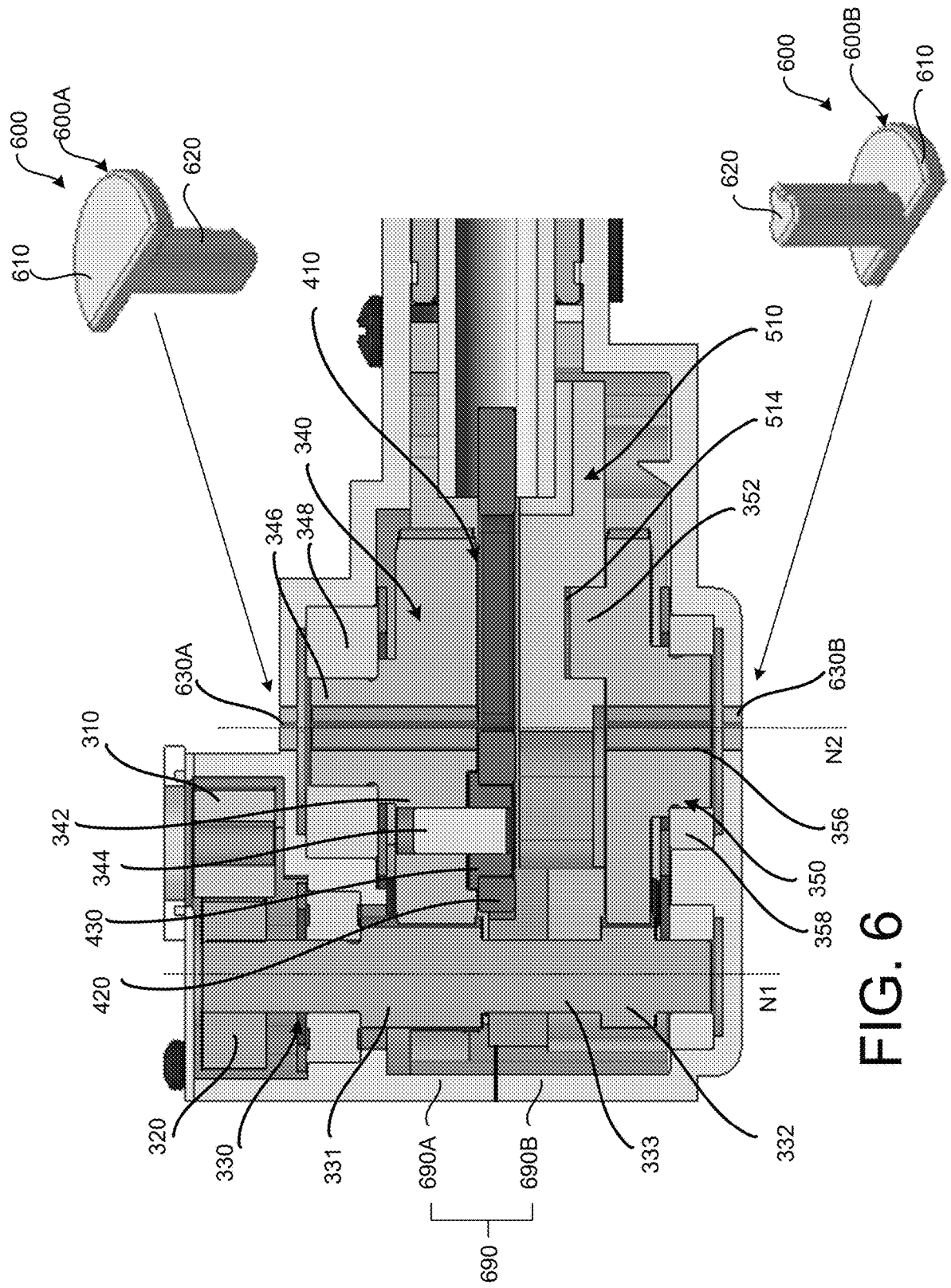
FIG. 6 illustrates alignment fixtures for setting an alignment of driving features of the example reciprocating device and the example counterbalancing device of the example power tool shown in FIGS. 2A-5D.

FIG. 6 is a cross-sectional view taken along line A-A of FIG. 2B, illustrating the reciprocating device 400 and the counterbalancing device 500 received in a gear housing 690. In the example arrangement shown in FIG. 6, the gear housing 690 is a split housing including a first gear housing 690A coupled to a second gear housing 690B. In the example orientation illustrated in FIG. 6, the first gear housing 690A can be considered an upper gear housing, and the second gear housing 690B can be considered a lower gear housing. In the example arrangement shown in FIG. 6, the pinion gear 310, the spur gear 320, a portion of the gear shaft 330 including the first gear portion 331, and components of the reciprocating device 400 are received in the first gear housing 690A. In the example arrangement shown in FIG. 6, a portion of the gear shaft 330 including the second gear portion 332 and components of the counterbalancing device 500 are received in the second gear housing 690B.

FIG. 6 illustrates example alignment fixtures 600 that be used in the assembly process to provide for proper alignment of the first output gear 340 and the second output gear 350 (in particular, the pin 344 fixed to the first output gear 340 and the protrusion 352 fixed to the second output gear 350), to in turn provide for the 180 degree out of phase operation of the reciprocating device 400 and the counterbalancing device 500, as described above. The alignment fixtures may provide for proper initial alignment of components, as well as to maintain the proper alignment of components through the assembly process. In the example arrangement shown in FIG. 6, a first alignment fixture 600A provides for positioning of the first output gear 340 and the pin 344 and a second alignment fixture 600B provides for positioning of the second output gear 350 and the protrusion 352 into the slot 514 formed in the counterweight member 510, at a position that is 180 degrees from the pin 344 relative to the axis of rotation N2.

As noted above, the gear housing 690 is a split housing in which the first gear housing 690A is separate from and coupled to the second gear housing 690B. In some examples, assembly of components associated with the reciprocating device 400 are assembled into the first gear housing 690A in a state in which the first gear housing 690A is separated from and not yet coupled to the second gear housing 690B. Similarly, in some examples, components associated with the counterbalancing device 500 are assembled into the second gear housing 690B in a state in which the second gear housing 690B is separated from and not yet coupled to the first gear housing 690A. In some examples, the first gear housing 690A and the second gear housing 690B are fully separated in the initial portions of the assembly process, when the components associated with reciprocating device 400 and the counterbalancing device 500 are assembled into the gear housing 690. In some examples, the first gear housing 690A and the second gear housing 690B are partially separated, for example, rotated apart about a hinge coupling the first gear housing 690A and the second gear housing 690B (not shown in FIG. 6) in the initial portions of the assembly process, when the components associated with reciprocating device 400 and the counterbalancing device 500 are assembled into the gear housing 690.

In the example shown in FIG. 6, each of the alignment fixtures 600 includes a head portion 610 and a shank portion 620. In some examples, the alignment fixtures 600 are fitted into openings in the gear housing 690 to facilitate the alignment of components during the assembly process. In some examples, the shank portion 620 includes surface features, or key features that are complementary to, or matched to, openings in the components to facilitate the proper alignment of components.

During assembly, the first gear housing 690A and second gear housing 690B are separated as described above. The shank portion 620 of the first alignment fixture 600A is inserted through a first opening 630A formed in the first gear housing 690A. The bearing 348 and the first output gear 340 are then fitted onto the shank portion 620 of the first alignment fixture 600A, with the pin 344 (fixed to the first output gear 340) positioned so as to engage the yoke portion 420 of the reciprocating shaft 410, as described above. For example, the shank portion 620 of the first alignment fixture 600A may extend through the first opening 630A in the gear housing 690 and be fitted into an opening 346 in the first output gear 340. In some examples, key features or surface features formed on an outer circumferential portion of the shank portion 620 of the first alignment fixture 600A may correspond to the positioning of key features or surface features formed on an inner circumferential surface of the opening 346 in the first output gear 340. The key features formed on the outer circumferential surface of the shank portion 620 and the key features formed on the inner circumferential surface of the opening 346 may dictate an insertion position/orientation and inhibit insertion of the shank portion 620 of the first alignment fixture 600A into the opening 346 in the first output gear 340 in an improper orientation. Thus, engagement of the key features formed on the shank portion 620 of the first alignment fixture 600A with the key features formed in the opening 346 of the first output gear 340 may assure the desired positioning of the pin 344 fixed to the first output gear 340. In particular, the engagement of the key features formed on the shank portion 620 of the first alignment fixture 600A with the key features formed in the opening 346 of the first output gear 340 may maintain the desired positioning of the pin 344 fixed to the first output gear 340 as the components of the transmission 300 are assembled in the gear housing 690.

Similarly, for assembly of components associated with the counterbalancing device 500, with the second gear housing 690B separated from the first gear housing 690A, the shank portion 620 of the second alignment fixture 600B is inserted through a second opening 630B formed in the second gear housing 690B. The bearing 358 and the second output gear 350 are then fitted onto the shank portion 620 of the second alignment fixture 600B, with the protrusion 352 (fixed to or integral with the second output gear 350) positioned 180 degrees from the position of the pin 344, and so as to engage the slot 514 formed in the counterweight member 510 positioned on the second output gear 350. For example, the shank portion 620 of the second alignment fixture 600B may extend through the second opening 630B in the gear housing 690 and be fitted into an opening 356 in the second output gear 350. Key features or surface features formed on an outer circumferential portion of the shank portion 620 of the second alignment fixture 600B may correspond to the positioning of key features or surface features formed on an inner circumferential surface of the opening 356 in the second output gear 350. The key features formed on the outer circumferential surface of the shank portion 620 and the key features formed on the inner circumferential surface of the opening 356 may dictate an insertion position/orientation and inhibit insertion of the shank portion 620 of the second alignment fixture 600B into the opening 356 in the second output gear 350 in an improper orientation. Thus, engagement of the key features formed on the shank portion 620 of the second alignment fixture 600B with the key features formed in the opening 356 of the second output gear 350 may assure the desired positioning of the protrusion 352 formed on or fixed to the second output gear 350 for positioning in the slot 514 formed in the counterweight member 510. In particular, the engagement of the key features formed on the shank portion 620 of the second alignment fixture 600B with the key features formed in the opening 356 of the second output gear 350 may maintain the desired positioning of the protrusion 352 formed on or fixed to the second output gear 350 as the components of the transmission 300 are assembled in the gear housing 690.

In this example, the first opening 630A and the second opening 630B are positioned corresponding to the second axis of rotation N2, about which the first output gear 340 and the second output gear 350 rotate.

Assembled and properly aligned positions of the first output gear 340 and pin 344 fixed thereto with the reciprocating shaft 410 and of the second output gear 350 and protrusion 352 with the counterweight member 510, with the first gear housing 690A and the second gear housing 690B in a separated state may be maintained by the shank portion 620 of the alignment fixtures 600 inserted in the respective openings 346, 356, and engagement of the respective key features. In this state, the first gear housing 690A and the second gear housing 690B may be brought together, and coupled or secured, to complete the assembly process. In some examples, the alignment fixtures 600 are removed from the first and second openings 630A, 630B in the gear housing 690 after the first gear housing 690A and the second gear housing 690B are brought together and closed, to complete assembly.

The transmission 300 having a parallel axis configuration in the example power tool 200, as described above, provides a relatively compact mechanism to transmit force from the motor 210 to an output accessory tool coupled to the example power tool 200, and a relatively compact mechanism to drive the reciprocating device 400 and the counterbalancing device 500. The parallel axis configuration of the transmission 300 provides for the conversion of a rotary force (from the motor 210) to a linear force, and linear movement, in particular, linear reciprocating movement, of the reciprocating device 400 and the counterbalancing device 500. The relatively compact form of the transmission 300 may, in turn, reduce an overall size, or profile of the power tool 200. In some examples, an overall size, or dimension, or profile, of the example power tool 200 in a height direction H (see FIG. 2A) of the example power tool 200 may be reduced due to the arrangement of rotating components along the first axis of rotation N1 and the second axis of rotation N2. This parallel axis configuration and corresponding reduction in overall height is afforded by the use of the single gear shaft 330 having the first gear portion 331 providing for rotation of the first output gear 340, and the second gear portion 332 providing for rotation of the second output gear 350. In some examples, an overall size, or dimension, or profile, of the example power tool 200 in a longitudinal direction L of the example power tool 200 may be reduced. The relatively compact tool profile afforded by the user of the transmission 300 having the parallel axis configuration may provide for improved user control of the example power tool 200 and may allow the user to work in and access smaller, more confined spaces using the example power tool 200.

In some examples, the counterbalancing of the reciprocating motion of the reciprocating device 400 provided by the counterbalancing device 500, as described above, may reduce vibration and improve stability of the example power tool 200 during use. The positioning of the bearings 338, 339 at opposite end portions of the gear shaft 330 at opposite end portions of the stack of output gears 340, 350 and reciprocating components may further reduce vibration and improve stability of the example power tool 200 during operation.

In some examples, the positioning of the pin 344 relative to the second axis of rotation N2 and of the protrusion 352 relative to the second axis of rotation, may provide for a greater stroke length in the reciprocating motion of the reciprocating shaft 410. That is, the example arrangement described above may allow for placement of the pin 344 and the protrusion 352 at a greater distance from the second axis of rotation N2, thus providing for greater travel distance of the reciprocating device reciprocating device 400 thereby improving functionality and utility of the example power tool 200.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A reciprocating power tool, comprising:
   a motor;
   a reciprocating device;
   a counterbalancing device; and
   a transmission coupled between the motor and the reciprocating device, and between the motor and the counterbalancing device, wherein the transmission includes a gear shaft configured to rotate in response to a driving force from the motor, the gear shaft including:
      a first gear portion formed on a first portion of the gear shaft, the first gear portion driving a first output gear, the first output gear driving the reciprocating device; and
      a second gear portion formed on a second portion of the gear shaft, the second gear portion driving a second output gear, the second output gear driving the counterbalancing device.

2. The reciprocating power tool of claim 1, wherein the gear shaft rotates about a first axis of rotation and the first output gear and the second output gear rotate about a second axis of rotation that is offset from and in parallel to the first axis of rotation.

3. The reciprocating power tool of claim 1, wherein a linear reciprocating direction of the counterbalancing device is opposite a linear reciprocating direction of the reciprocating device so as to balance a linear reciprocating movement of the reciprocating device.

4. The reciprocating power tool of claim 1, wherein a configuration of the first gear portion corresponds to a configuration of the second gear portion, and a configuration of the first output gear corresponds to a configuration of the second output gear, such that a rotational speed output by the first output gear corresponds to a rotational speed of the second output gear.

5. The reciprocating power tool of claim 1, wherein a linear reciprocating direction of the reciprocating device and a linear reciprocating direction of the counterbalancing device is substantially orthogonal to a first axis of rotation of the gear shaft and a second axis of rotation of the first output gear and the second output gear.

6. The reciprocating power tool of claim 5, wherein the reciprocating device includes:
   a reciprocating shaft positioned between the first output gear and the second output gear; and
   a pin fixed to the first output gear and coupled in a slot formed in a yoke portion of the reciprocating shaft, wherein the pin is eccentrically positioned relative to the second axis of rotation.

7. The reciprocating power tool of claim 6, wherein the pin is movably received in the slot formed in the yoke portion of the reciprocating shaft, such that the pin is configured to move in the slot formed in the yoke portion of the reciprocating shaft in response to rotation of the first output gear about the second axis of rotation, and the reciprocating shaft is configured to perform a linear reciprocating movement in response to movement of the pin in the slot formed in the yoke portion of the reciprocating shaft.

8. The reciprocating power tool of claim 6, wherein the counterbalancing device includes:
   a counterweight member positioned between the second output gear and the reciprocating shaft,
   the counterweight member including a slot formed on a side portion of the counterweight member facing the second output gear, and
   a protrusion formed on the second output gear, eccentrically positioned with respect to the second axis of rotation, wherein the protrusion is movably received in the slot formed in the counterweight member.

9. The reciprocating power tool of claim 8, wherein the protrusion is configured to move in the slot formed in the counterweight member in response to rotation of the second output gear about the second axis of rotation and the counterweight member is configured to perform a linear reciprocating movement in response to movement of the protrusion in the slot formed in the counterweight member.

10. The reciprocating power tool of claim 8, wherein the protrusion is positioned approximately 180 degrees from the pin with respect to the second axis of rotation.

11. The reciprocating power tool of claim 8, wherein
   the reciprocating shaft is configured to reciprocate linearly in response to rotation of the first output gear and movement of the pin in the slot formed in the yoke portion of the reciprocating shaft, and
   the counterweight member is configured to reciprocate linearly in response to rotation of the second output gear about the second axis of rotation movement of the protrusion in the slot formed in the counterweight member, the linear reciprocating direction of the counterweight member being opposite the linear reciprocating direction of the reciprocating shaft.

12. The reciprocating power tool of claim 8, wherein the counterweight member also includes:

a recess formed in a first end portion of the counterweight member and configured to receive a coupling portion of the reciprocating shaft; and an opening formed in a second end portion of the counterweight member and configured to selectively receive an intermediate portion of the gear shaft, between the first gear portion and the second gear portion, as the counterweight member reciprocates.

13. The reciprocating power tool of claim 8, further comprising a rail guide positioned between the counterweight member and the reciprocating shaft, the rail guide including:

a first rail seated on a first stepped portion at a first lateral side of the counterweight member;

a first guide slot formed in the first rail;

a second rail seated on a second stepped portion at a second lateral side of the counterweight member; and a second guide slot formed in the second rail, wherein the first guide slot and the second guide slot are positioned so as to guide reciprocating movement of the yoke portion of the reciprocating shaft and restrict rotation of the reciprocating shaft.

14. The reciprocating power tool of claim 1, wherein the transmission also includes:

a pinion gear coupled to an output shaft of the motor and configured to rotate in response to the driving force generated by the motor;

a spur gear mounted on an end portion of the gear shaft and in meshed engagement with the pinion gear, wherein the spur gear and the gear shaft are configured to rotate in response to rotation of the pinion gear, the first output gear is configured to rotate in response to rotation of the gear shaft and first gear portion formed thereon to drive the reciprocating device, and the second output gear is configured to rotate in response to rotation of the gear shaft and second gear portion formed thereon to drive the counterbalancing device.

15. The reciprocating power tool of claim 1, wherein:

a position of the first output gear is set by a first alignment fixture that extends through an opening in a first portion of a housing of the power tool and into an opening formed in the first output gear, with key features formed on an external portion of the first alignment fixture corresponding to key features formed on an internal portion of the opening formed in the first output gear into which the first alignment fixture is inserted; and a position of the second output gear is set by a second alignment fixture that extends through a second opening in a second portion of the housing of the power tool and into an opening formed in the second output gear, with key features formed on an external portion of the second alignment fixture corresponding to key features formed on an internal portion of the opening formed in the second output gear into which the second alignment fixture is inserted.

16. The reciprocating power tool of claim 15, wherein engagement of the key features formed on the external portion of the first alignment fixture with the key features formed on the internal portion of the opening in the first output gear, and engagement of the key features formed on the external portion of the second alignment fixture with the key features formed on the internal portion of the opening in the second output gear maintain a relative position of the first output gear and the second output gear, such that linear reciprocating movement of the reciprocating device is 180 degrees out of phase with linear reciprocating movement of the counterbalancing device.

17. A reciprocating power tool, comprising:

a motor;

a reciprocating device;

a counterbalancing device; and a parallel axis transmission coupled between the motor and the reciprocating device, and between the motor and the counterbalancing device, and including a gear shaft with a first gear portion that drives a first output gear that drives the reciprocating device and a second gear portion that drives a second output gear that drives the counterbalancing device to convert a rotational force output by the motor to a linear reciprocating movement of the reciprocating device, and to a linear reciprocating movement of the counterbalancing device that is opposite that of the reciprocating device so as to balance the linear reciprocating movement of the reciprocating device.

18. The reciprocating power tool of claim 17, wherein:

the gear shaft rotates about a first axis of rotation in response to a rotational force transmitted from the motor;

the first output gear rotates about a second axis of rotation in response to rotation of the gear shaft; and the second output gear rotates about the second axis of rotation in response to rotation of the gear shaft, the second axis of rotation being offset from and parallel to the first axis of rotation.

19. The reciprocating power tool of claim 18, wherein a configuration of the first gear portion corresponds to a configuration of the second gear portion, and a configuration of the first output gear corresponds to a configuration of the second output gear, such that a rotational speed output by the first output gear corresponds to a rotational speed of the second output gear.

20. The reciprocating power tool of claim 18, wherein the reciprocating device includes:

a reciprocating shaft positioned between the first output gear and the second output gear; and a pin fixed to the first output gear and coupled in a slot formed in a yoke portion of the reciprocating shaft, wherein the pin is eccentrically positioned relative to the second axis of rotation.

21. The reciprocating power tool of claim 20, wherein the counterbalancing device includes:

a counterweight member positioned between the second output gear and the reciprocating shaft, the counterweight member including a slot formed on a side portion of the counterweight member facing the second output gear; and a protrusion formed on the second output gear, eccentrically positioned with respect to the second axis of rotation, wherein the protrusion is movably received in the slot formed in the counterweight member.

22. The reciprocating power tool of claim 21, wherein the protrusion is positioned approximately 180 degrees from the pin with respect to the second axis of rotation.

23. The reciprocating power tool of claim 21, wherein the pin is movably received in the slot formed in the yoke portion of the reciprocating shaft, such that the pin is configured to move in the slot formed in the yoke portion in response to rotation of the first output gear about the second axis of rotation, and the reciprocating shaft is configured to perform a linear reciprocating movement in response to movement of the pin in the slot formed in the yoke portion of the reciprocating shaft; and wherein the protrusion is configured to move in the slot formed in the counterweight member in response to rotation of the second output gear about the second axis of rotation, and the counterweight member is configured to perform a linear reciprocating movement in response to movement of the protrusion in the slot formed in the counterweight member, the linear reciprocating movement of the counterweight member being opposite the linear reciprocating movement of the reciprocating shaft.

24. The reciprocating power tool of claim 21, wherein the counterweight member also includes:

a recess formed in a first end portion of the counterweight member and configured to receive a coupling portion of the reciprocating shaft; and an opening formed in a second end portion of the counterweight member and configured to selectively receive an intermediate portion of the gear shaft, between the first gear portion and the second gear portion, as the counterweight member reciprocates.

25. The reciprocating power tool of claim 21, further comprising a rail guide positioned between the counterweight member and the reciprocating shaft, the rail guide including:

a first rail seated on a first stepped portion at a first lateral side of the counterweight member;

a first guide slot formed in the first rail;

a second rail seated on a second stepped portion at a second lateral side of the counterweight member; and a second guide slot formed in the second rail, wherein the first guide slot and the second guide slot are positioned so as to guide reciprocating movement of the yoke portion of the reciprocating shaft and restrict rotation of the reciprocating shaft.

26. The reciprocating power tool of claim 18, wherein the transmission also includes:

a pinion gear coupled to an output shaft of the motor and configured to rotate in response to the rotational force generated by the motor;

a spur gear mounted on an end portion of the gear shaft and in meshed engagement with the pinion gear, wherein the spur gear and the gear shaft are configured to rotate in response to rotation of the pinion gear, the first output gear is configured to rotate in response to rotation of the gear shaft and first gear portion formed thereon to drive the reciprocating device, and the second output gear is configured to rotate in response to rotation of the gear shaft and second gear portion formed thereon to drive the counterbalancing device.

* * * * *